(12) United States Patent
Zhang et al.

(10) Patent No.: US 11,733,264 B2
(45) Date of Patent: Aug. 22, 2023

(54) CANTILEVER, SCANNING PROBE MICROSCOPE, AND MEASUREMENT METHOD USING SCANNING PROBE MICROSCOPE

(71) Applicant: Hitachi High-Tech Corporation, Tokyo (JP)

(72) Inventors: Kaifeng Zhang, Tokyo (JP); Takenori Hirose, Tokyo (JP); Tomonori Saeki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 17/630,698

(22) PCT Filed: Apr. 30, 2020

(86) PCT No.: PCT/JP2020/018300
§ 371 (c)(1),
(2) Date: Jan. 27, 2022

(87) PCT Pub. No.: WO2021/019861
PCT Pub. Date: Feb. 4, 2021

(65) Prior Publication Data
US 2022/0260611 A1  Aug. 18, 2022

(30) Foreign Application Priority Data

Jul. 31, 2019 (JP) .................................. 2019-141453
Apr. 17, 2020 (JP) .................................. 2020-073827

(51) Int. Cl.
*G01Q 60/22* (2010.01)
*G01Q 70/10* (2010.01)
(Continued)

(52) U.S. Cl.
CPC .......... *G01Q 10/045* (2013.01); *G01Q 20/02* (2013.01); *G01Q 20/04* (2013.01); *G01Q 60/22* (2013.01)

(58) Field of Classification Search
CPC ............................. G01Q 60/18; G01Q 70/10
See application file for complete search history.

(56) References Cited

U.S. PATENT DOCUMENTS 6,144,028 A    11/2000  Kley
10,877,065 B2  12/2020  Zhang et al.
(Continued)

FOREIGN PATENT DOCUMENTS

JP    H10-506457 A    6/1998
JP    2005-216405 A   8/2005
(Continued)

OTHER PUBLICATIONS

Written Opinion of International Searching Authority, PCT/JP2020/018300, dated Aug. 11, 2020, 5 pgs.
(Continued)

*Primary Examiner* — Eliza W Osenbaugh-Stewart
(74) *Attorney, Agent, or Firm* — Volpe Koenig

(57) ABSTRACT

To enhance the measurement sensitivity of a scanning probe microscope. In a cross sectional view, a cantilever includes a vertex portion that is a portion close to a sample and is covered by a metallic film, a ridge that is connected to the vertex portion and is covered by the metallic film, and an upper corner portion that is connected to the ridge. Here, the upper corner portion and a part of the ridge are portions to be irradiated with excitation light emitted from a light source of the scanning probe microscope.

19 Claims, 22 Drawing Sheets

(51) Int. Cl.
  *G01Q 10/04* (2010.01)
  *G01Q 20/02* (2010.01)
  *G01Q 20/04* (2010.01)

(56) References Cited

U.S. PATENT DOCUMENTS

| | | |
|---|---|---|
| 2003/0038233 A1 | 2/2003 | Inoue et al. |
| 2008/0286563 A1 | 11/2008 | Konakahara |
| 2010/0141939 A1 | 6/2010 | Zhan |
| 2015/0355227 A1 | 12/2015 | Gluckstad |
| 2018/0120345 A1 | 5/2018 | De Lourenco E Vasconcelos et al. |
| 2018/0372776 A1 | 12/2018 | Zhang et al. |

FOREIGN PATENT DOCUMENTS

| | | |
|---|---|---|
| JP | 2008-281530 A | 11/2008 |
| JP | 2017-150814 A | 8/2017 |
| JP | 2019-007756 A | 1/2019 |
| WO | 2015/033681 A | 12/2015 |
| WO | 2016/067398 A1 | 5/2016 |

OTHER PUBLICATIONS

Taiwanese Office Action, Taiwanese Patent Application No. 109124755, dated Feb. 22, 2021, 14 pgs.

Olympus Corporation, Integrated OMCL/BL Series Borchure, http://probe.olympus-global.com/en/support/catalog/, Jul. 2021.

Olympus Corporation, Micro Cantilever, OMCL/BL Series, http://probe.olympus-global.com/en/product/, Nov. 2016.

Olympus Corporation, Olympus Micro Cantilevers: Product Line, http://probe.olympus-global.com/en/product/, Nov. 2016.

Inouye et al., "Near-field scanning optical microscope with a metallic probe tip", Optics Letters, Feb. 1, 1994 pp. 15-161, vol. 19, No. 3.

Hayazawa et al. "Detection and characterization of longitudinal field for tip-enhanced Raman spectroscopy", Applied Physics Letter, Dec. 20, 2004, pp. 6238-6241, col. 85, No. 25, American Institute of Physics.

Bekarevich et al., "Refiling of carbon nanotube cartridges for 3D nanomanufacturing", Nanoscale, The Royal Society of Chemistry, 2016, pp. 7217-7223, vol. 8.

Japanese Office Action, Japanese Patent Application No. 2017-121232, dated Mar. 23, 2021, 5 pgs.

FIG. 16
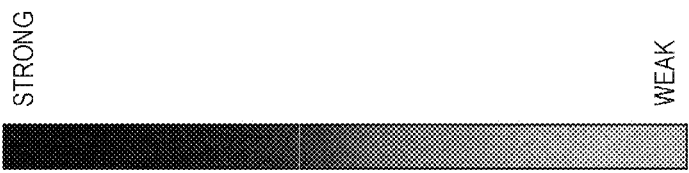
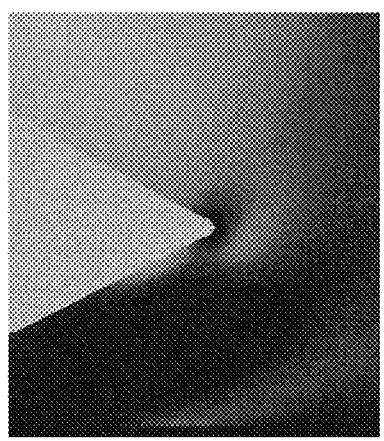
(2)
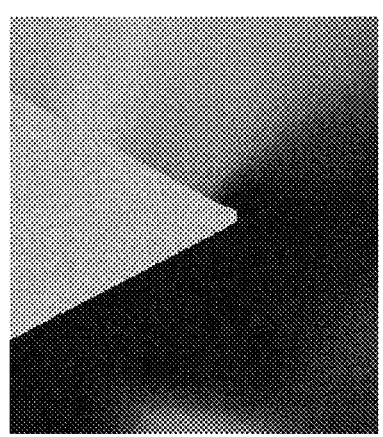
(4)
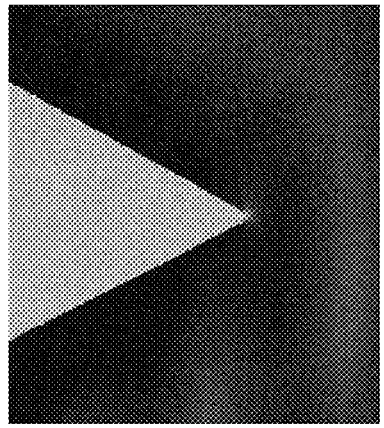
(1)
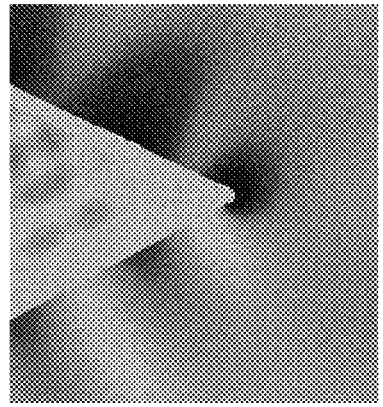
(3)

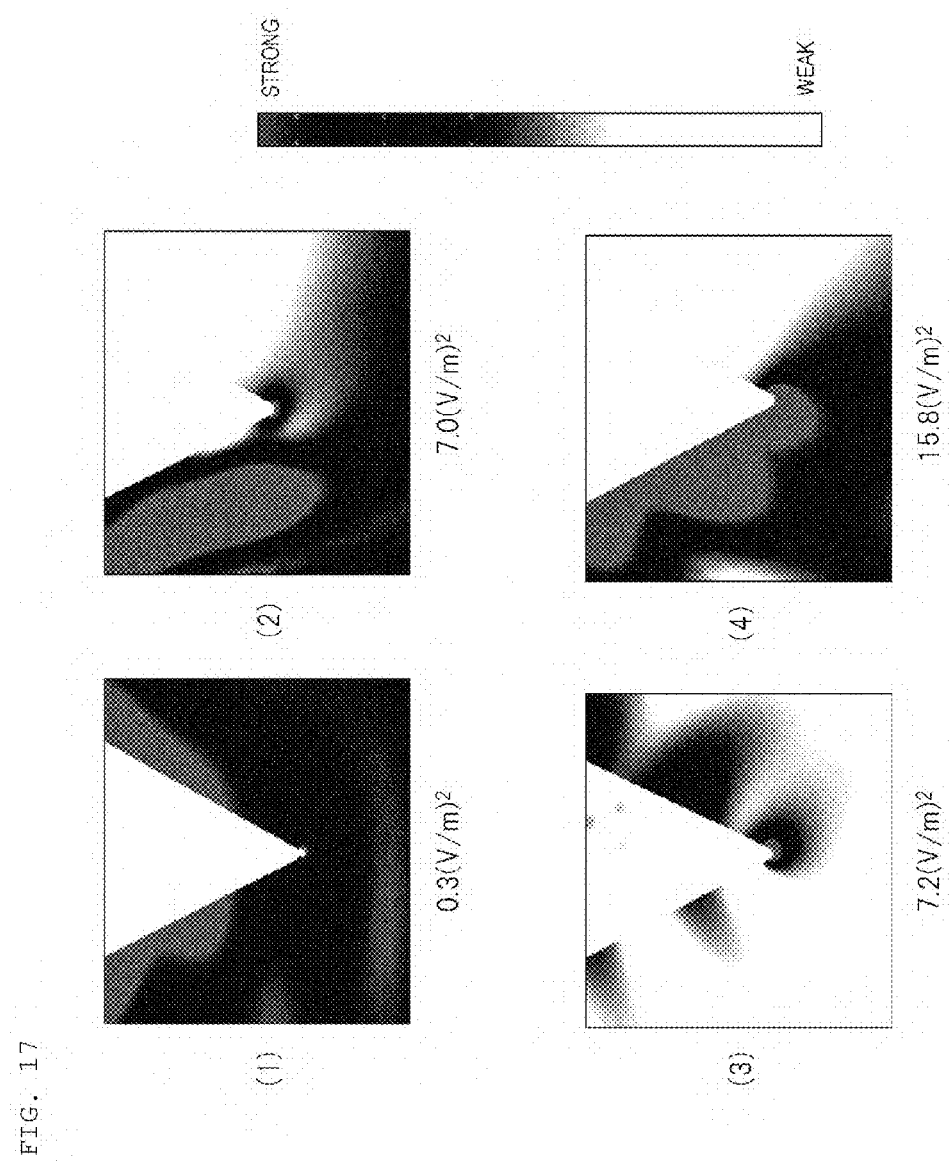

E = 21.5 V/m

E = 13.9 V/m

CANTILEVER, SCANNING PROBE MICROSCOPE, AND MEASUREMENT METHOD USING SCANNING PROBE MICROSCOPE

TECHNICAL FIELD

The present invention relates to a cantilever, a scanning probe microscope, and a measurement technique using a scanning probe microscope, and relates to, for example, a technique that is effective when applied to a cantilever used in a spectroscopic probe microscope represented by a near-field optical probe microscope and a tip-enhanced Raman scattering (TERS) microscope.

BACKGROUND ART

A scanning near-field optical microscope (SNOM) is known as a device for measuring optical properties and physical property information of a surface of an object (sample) with high resolution. In recent years, as one application of the SNOM technique, a scanning probe microscope capable of nano-resolution Raman spectroscopic measurement utilizing a local enhancement effect of near-field light has been developed.

For example, JP-A-2019-7756 (PTL 1) describes a technique in which in a scanning probe microscope that can improve spatial resolution and reproducibility of measurement, a thin film waveguide is formed at a tip portion of a cantilever (probe) by a FIB processing technique, and near-field light is generated at the tip portion of the cantilever by light incident on the thin film waveguide due to a plasmon resonance angle.

This technique is a technique in which a noble metallic film is formed on the cantilever such that the probe-enhanced Raman spectroscopic measurement can be implemented, and the measurement is performed by indirect light incident at the tip portion.

CITATION LIST

Patent Literature

PTL 1: JP-A-2019-7756

SUMMARY OF INVENTION

Technical Problem

The technique described in PTL 1 described above aims to improve an intensity of the near-field light at the tip portion by generating surface plasmon and propagating the surface plasmon to the tip portion of the cantilever. However, as a result of a long propagation distance of the surface plasmon, a problem that the intensity of the near-field light cannot be sufficiently improved due to the surface plasmon has become clear. That is, there is room for improvement in the technique described in PTL 1 described above, for example, from the viewpoint of improving measurement sensitivity of probe-enhanced Raman spectroscopy using a scanning probe microscope.

Other problems and novel characteristics will become apparent from a description of the present specification and the accompanying drawings.

Solution to Problem

A cantilever according to an embodiment is used in a scanning probe microscope. Then, in a cross sectional view, the cantilever includes a vertex portion that is a portion close to a sample and is covered by a metallic film, a ridge that is connected to the vertex portion and is covered by the metallic film, and an upper corner portion that is connected to the ridge. Here, the upper corner portion and a part of the ridge are portions to be irradiated with excitation light emitted from an excitation light source mounted on the scanning probe microscope system.

A scanning probe microscope according to an embodiment includes a sample holder that holds a sample, a light source that emits excitation light, and a cantilever that is to be irradiated with the excitation light. Here, the cantilever included in the scanning probe microscope has the above-described structure.

A cantilever according to an embodiment includes a probe portion and a beam portion that is connected to the probe portion from a lower surface and configured to hold the probe portion. Then, in a cross sectional view, the probe portion includes a vertex portion that is covered by a metallic film, a first line that connects the vertex portion and the beam portion, a ridge that is connected to the vertex portion and is covered by the metallic film, an upper corner portion that is connected to the ridge, and a second line that connects the upper corner portion and the beam portion. At this time, the second line has either a first configuration or a second configuration. Here, the first configuration is a configuration in which each of the first line and the second line includes a straight portion directly connected to the beam portion, and an interval between the straight portion of the first line and the straight portion of the second line is the same or narrower as the straight portions approach the vertex portion. On the other hand, the second configuration is a configuration in which the second line includes an extension line portion that is located on extension of the ridge, and a recessed portion that connects the upper corner portion and the extension line portion and is recessed toward the first line side.

A measurement method using a scanning probe microscope according to an embodiment includes: (a) a step of irradiating a cantilever with excitation light emitted from a light source; and (b) a step of detecting scattered light from a sample disposed opposite to the cantilever. Here, the cantilever includes a vertex portion that is a portion close to the sample and is covered by a metallic film, a ridge that is connected to the vertex portion and is covered by the metallic film, and an upper corner portion that is connected to the ridge. At this time, the upper corner portion and a part of the ridge are portions to be irradiated with the excitation light emitted from the light source of the scanning probe microscope.

Advantageous Effect

According to the embodiment, the measurement sensitivity of the scanning probe microscope can be improved.

BRIEF DESCRIPTION OF DRAWINGS

FIG. 16 is a simulation result when the vicinity of a tip of the probe portion is enlarged.

FIG. 17 is a simulation result when image processing is performed such that an electric field intensity at the vicinity of the tip of the probe portion can be easily grasped.

DESCRIPTION OF EMBODIMENTS

Figure 1:
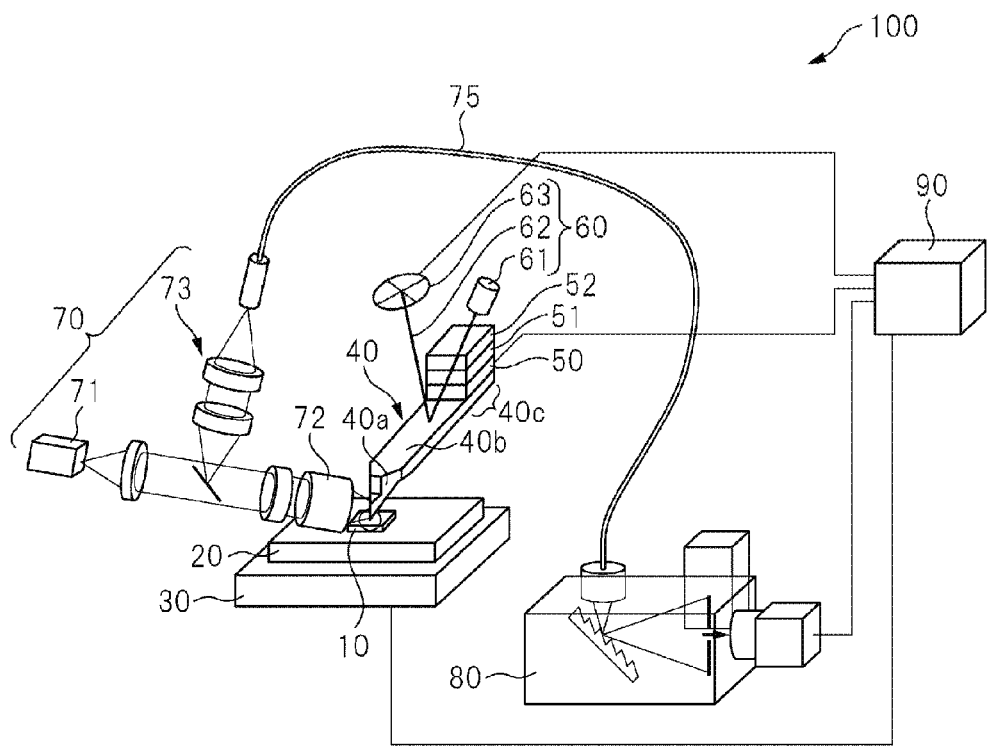
FIG. 1 is a diagram showing a schematic configuration of a scanning probe microscope according to an embodiment.

In the following embodiments, the description may be divided into a plurality of sections or embodiments if necessary for convenience. Unless particularly specified, the sections or embodiments are not independent of each other, but have a relation in which one section or embodiment is a modification, detailed description, supplementary description, or the like of a part or all of another section or embodiment.

In the following embodiments, when a number and the like (including the number, a numeric value, an amount, a range, and the like) of an element is referred to, these parameters are not limited to specific numbers, and the values may be equal to or greater than or equal to or less than these specific numbers, unless otherwise specified or unless the specific numbers are clearly limited to specific numbers in principle.

Further, in the following embodiments, it is needless to say that the constituent element (including element steps) are not always indispensable unless otherwise specified or except the case where the components are apparently indispensable in principle.

Similarly, in the following embodiments, when referring to shapes, positional relationships, and the like of the constituent elements and the like, shapes and the like which are substantially approximate or similar to those are included, unless particularly specified or considered to be apparently excluded in principle. The same applies to the numerical value and the range.

The same components are generally denoted by the same reference symbols throughout all the drawings for describing the embodiments, and the repetitive description thereof will be omitted. To make a drawing easy to understand, hatching is sometimes applied to the drawing even if the drawing is a plan view.

<Overview of Scanning Probe Microscope>

A scanning probe microscope (SPM) is a general term for microscopes represented by scanning tunneling microscopes and atomic force microscopes. This scanning probe microscope is a microscope that scans a sample with a minute probe to observe a shape and properties of the sample. In particular, in the scanning probe microscope, by bringing a tip of the probe close to the surface of the sample and scanning the sample while detecting a mechanical and electromagnetic interaction between the sample and the probe, a magnified image and physical property information of the sample surface can be obtained. For example, the scanning probe microscope has atomic level or molecular level resolution with respect to the sample. Here, in recent years, the physical property information such as optical properties of the sample has been investigated by using the scanning probe microscope having atomic level resolution. Specifically, by irradiating the tip portion of the probe with excitation light from a light source, near-field light (local electric field concentration) is formed at the tip portion of the probe, and scattered light from the sample caused by the near-field light is detected. Then, by analyzing the scattered light, the physical property information of the sample is obtained.

For example, when Rayleigh scattered light is detected as the scattered light, the physical property information such as reflectance and surface roughness of the surface of the sample can be obtained. On the other hand, when Raman scattered light is detected, it is possible to identify the type of chemical bond and a substance constituting the sample.

The scanning probe microscope according to the present embodiment can be widely applied to techniques for detecting the Rayleigh scattered light and the Raman scattered light. In particular, in the present embodiment, attention is paid to a spectroscopic measurement technique for detecting the Raman scattered light using the scanning probe microscope. That is, the scanning probe microscope according to the present embodiment is a microscope that implements probe-enhanced Raman spectroscopic measurement using the near-field light formed at the tip portion of the probe. In this scanning probe microscope, the ingenuity is devised to improve the detection sensitivity for the Raman scattered light. Specifically, in the present embodiment, attention is paid to improving the intensity of the near-field light at the tip portion of the probe in order to improve the detection sensitivity for the Raman scattered light. This is because the intensity of the Raman scattered light is extremely weak compared to the intensity of the Rayleigh scattered light, and is stronger according to the intensity of the near-field light, and therefore, if the intensity of the near-field light formed at the tip portion of the probe can be increased, the detection sensitivity for the Raman scattered light can be improved.

In this regard, in the present embodiment, by devising the ingenuity regarding the shape of the probe portion of the cantilever, which is a component of the scanning probe microscope, and devising a method of irradiating the probe portion of the cantilever with the excitation light, the intensity of the near-field formed at the tip of the probe portion is increased. In the following, before describing the ingenuity regarding the shape of the probe portion of the cantilever, first, a configuration and an operation of the scanning probe microscope including the cantilever will be briefly described.

<Configuration of Scanning Probe Microscope>

FIG. 1 is a diagram showing a schematic configuration of a scanning probe microscope according to the present embodiment.

A scanning probe microscope 100 shown in FIG. 1 is, for example, a microscope called a near-field optical scanning probe microscope or a probe-enhanced Raman spectroscopic scanning probe microscope.

In FIG. 1, the scanning probe microscope 100 according to the present embodiment includes a sample holder 20 on which a sample 10 is mounted, a piezoelectric element stage 30 on which the sample holder 20 is disposed, and a cantilever 40 including a probe portion 40a, a beam portion 40b, and a held portion 40c. Here, the beam portion 40b may be a structure that plays a role of a leaf spring. The piezoelectric element stage 30 is configured such that the sample 10 can be relatively scanned with the probe portion 40a of the cantilever 40 in xy directions. Then, the cantilever 40 is made of, for example, any material of silicon, silicon oxide, and silicon nitride.

In addition, the scanning probe microscope 100 according to the present embodiment includes a piezoelectric element stage 50 on which the sample 10 is relatively scanned with the cantilever 40, a piezoelectric element actuator 51, and a head 52 that holds the cantilever 40 via the piezoelectric element stage 50 and the piezoelectric element actuator 51. In other words, the cantilever 40 includes the held portion 40c held by the head 52 via the piezoelectric element stage 50 and the piezoelectric element actuator 51. However, when the cantilever 40 is not vibrated by the piezoelectric element actuator 51 (for example, when a cantilever having a self-detection performance is used as a base material), the piezoelectric element actuator 51 is not necessarily required.

Further, the scanning probe microscope 100 according to the present embodiment includes an optical lever detection unit 60. The optical lever detection unit 60 is configured to detect deformation of the beam portion 40b of the cantilever 40. Specifically, the optical lever detection unit 60 includes a light source 61 and a photodetector 63. The optical lever detection unit 60 is configured to emit light 62 from the light source 61 toward the beam portion 40b of the cantilever 40, and to receive by the photodetector 63 the light 62 (reflected light) reflected by the beam portion 40b of the cantilever 40. At this time, the optical lever detection unit 60 is configured to detect, by the photodetector 63, a position change of the light 62 (reflected light) caused by the deformation of the cantilever 40.

Further, the scanning probe microscope 100 according to the present embodiment includes an incident and detection optical system 70. The incident and detection optical system 70 includes, for example, a light source 71 that emits laser light (excitation light), a lens 72 that condenses the laser light, and a light receiving optical system 73 that receives Raman scattered light from the sample 10. It is possible to perform spectroscopic measurement by using a spectroscope. As the excitation light emitted from the light source 71, for example, single-wavelength laser light can be used, but the invention is not limited thereto, and the excitation light can be laser light having multiple wavelengths.

Furthermore, the scanning probe microscope 100 according to the present embodiment further includes a spectroscope 80 optically connected to the light receiving optical system 73 via an optical fiber 75, and a control unit 90 electrically connected to the spectroscope 80. Here, the spectroscope 80 is configured to receive the Raman scattered light from the light receiving optical system 73 via the optical fiber 75 and to separate each Raman spectrum component of the Raman scattered light. On the other hand, the control unit 90 is configured to control the piezoelectric element stage 30 and the piezoelectric element stage 50. Further, the control unit 90 is connected to the optical lever detection unit 60, and is configured to detect, based on a deformation amount of the cantilever 40 detected by the optical lever detection unit 60, a force and a distance acting between the probe portion 40a of the cantilever 40 and the sample 10. Then, the control unit 90 is configured to scan the entire surface of the sample 10 with the probe portion 40a of the cantilever 40 by controlling the piezoelectric element stage 30 and the piezoelectric element stage 50 such that the deformation amount of the cantilever 40 is constant. Further, the control unit 90 is configured to generate and output a Raman spectrum image and a surface unevenness image, which are near-field light images, based on xyz displacement signals for controlling the piezoelectric element stage 30 and the piezoelectric element stage 50 and an output signal from the spectroscope 80.

In the scanning probe microscope 100 according to the present embodiment configured as described above, since the lens 72 is also used in the incident and detection optical system 70, the configuration of the scanning probe microscope 100 can be simplified.

Next, the operation of the scanning probe microscope 100 according to the present embodiment will be briefly described. First, in FIG. 1, by controlling the piezoelectric element stage 30 and the piezoelectric element stage 50 by the control unit 90, the probe portion 40a of the cantilever 40 is disposed at a predetermined position close to the sample 10. Thereafter, the probe portion 40a of the cantilever 40 is irradiated with the excitation light emitted from the light source 71. Then, near-field light is generated at the tip of the probe portion 40a, and as a result, scattered light including the Raman scattered light is emitted from the sample 10 disposed to face the cantilever 40. The scattered light passes through the lens 72 and the light receiving optical system 73, and is then detected by the spectroscope 80 via the optical fiber 75. The Raman scattered light incident on the spectroscope 80 is separated into Raman spectrum components by the spectroscope 80. Thereafter, a signal corresponding to each Raman spectrum component is output from the spectroscope 80 to the control unit 90. Such an operation is repeated while scanning the surface of the sample 10 with the probe portion 40a of the cantilever 40. Specifically, the control unit 90 scans the entire surface of the sample 10 with the probe portion 40a of the cantilever 40 by controlling the piezoelectric element stage 30 and the piezoelectric element stage 50 such that the deformation amount of the cantilever 40 is constant. Accordingly, the Raman spectroscopic spectrum image and the surface unevenness image are generated in the control unit 90.

<First Modification of Scanning Probe Microscope>

Figure 2:
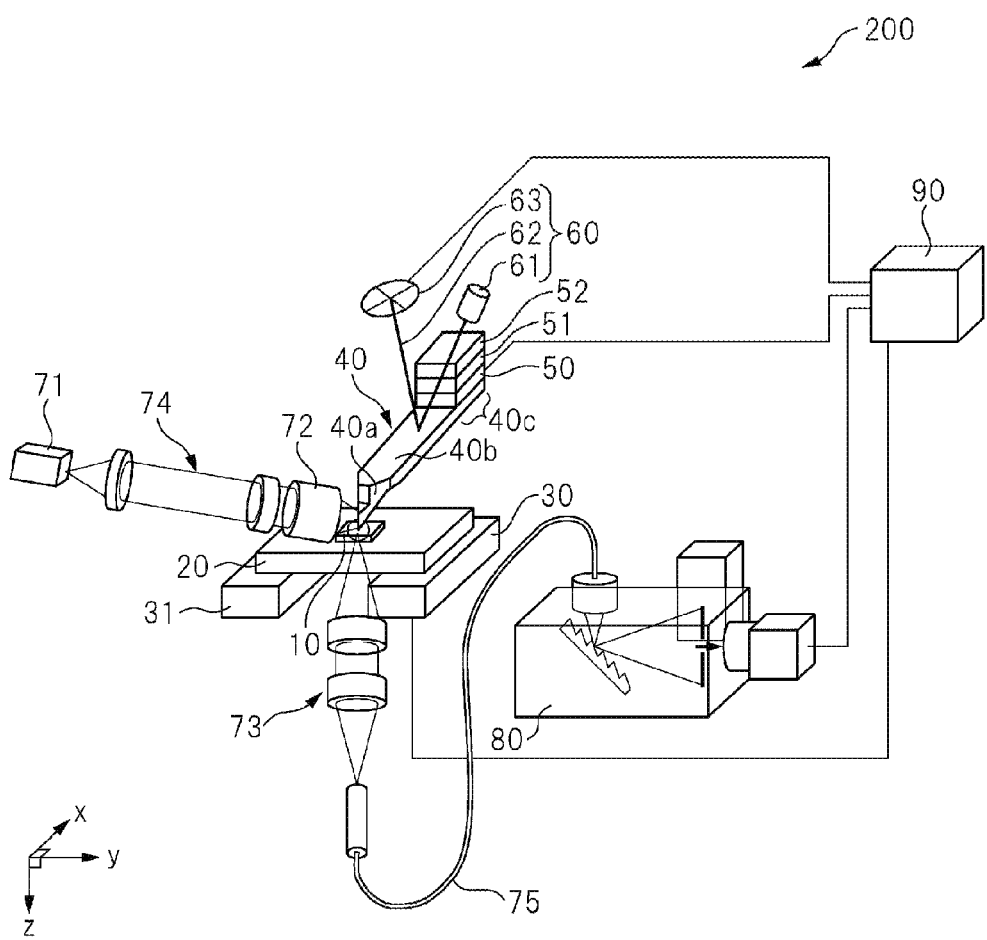
FIG. 2 is a diagram showing a schematic configuration of a scanning probe microscope according to a first modification.

FIG. 2 is a diagram showing a schematic configuration of a scanning probe microscope according to a first modification.

A scanning probe microscope 200 according to the first modification shown in FIG. 2 detects Raman scattered light transmitted through the sample 10 among the Raman scattered light emitted from the sample 10.

Specifically, in the scanning probe microscope 200 according to the first modification, the probe portion 40a of the cantilever 40 is irradiated with excitation light from the light source 71 of an incident optical system 74, thereby generating near-field light at the tip of the probe portion 40a. Then, among the Raman scattered light emitted from the sample 10 disposed to face the cantilever 40, the Raman scattered light transmitted through the sample 10 passes through the light receiving optical system 73 and the optical fiber 75 and is condensed on the spectroscope 80, and a Raman spectroscopic spectrum is detected. Here, as shown in FIG. 2, in the first modification, the piezoelectric element stage 30 on which the sample 10 disposed on the sample holder 20 is scanned in the xy directions needs to allow the Raman scattered light transmitted through the sample 10 to pass therethrough. Therefore, as shown in FIG. 2, the piezoelectric element stage 30 is provided with an opening portion 31, and the Raman scattered light transmitted through the sample 10 passes through the opening portion 31 and is incident on the light receiving optical system 73. Other configurations are the same as those of the scanning probe microscope 100 shown in FIG. 1, and thus the description thereof will be omitted.

According to the scanning probe microscope 200 of the first modification, since the Raman scattered light is hard to be blocked by the cantilever 40 and the piezoelectric element stage 30, it is possible to increase a detection solid angle. As a result, it is possible to obtain Raman spectroscopic measurement having high sensitivity and a near-field light image or a Raman spectroscopic spectrum image having high contrast. That is, according to the scanning probe microscope 200 of the first modification, it is possible to improve an S/N ratio and measurement reproducibility of the near-field light image or the Raman spectroscopic spectrum image.

<Second Modification of Scanning Probe Microscope>

Figure 3:
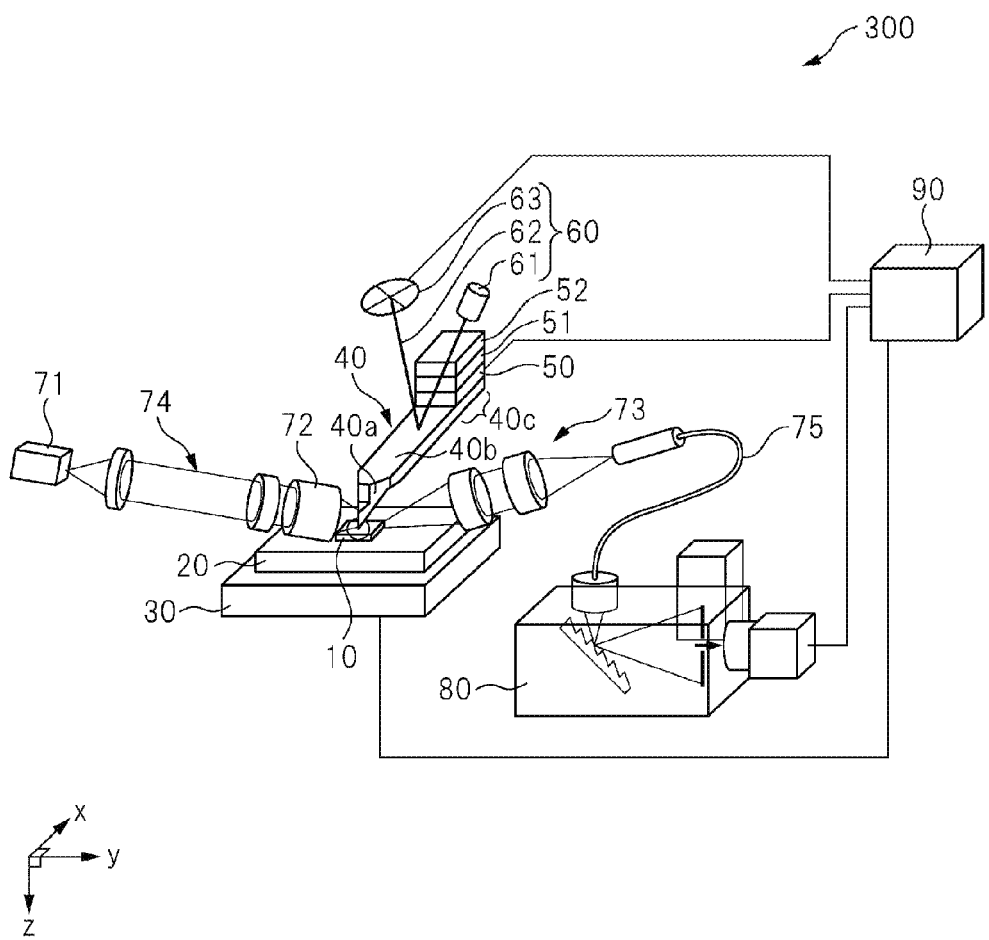
FIG. 3 is a diagram showing a schematic configuration of a scanning probe microscope according to a second modification.

FIG. 3 is a diagram showing a schematic configuration of a scanning probe microscope according to a second modification.

In a scanning probe microscope 300 according to the second modification shown in FIG. 3, among the Raman scattered light emitted from the sample 10, Raman scattered light scattered in a side surface direction of the cantilever 40 is detected. Specifically, in the scanning probe microscope 300 according to the second modification, the probe portion 40a of the cantilever 40 is irradiated with excitation light from the light source 71 of the incident optical system 74, thereby generating near-field light at the tip of the probe portion 40a. Then, among the Raman scattered light emitted from the sample 10 disposed to face the cantilever 40, the Raman scattered light scattered in the side surface direction of the cantilever 40 passes through the light receiving optical system 73 and the optical fiber 75 and is condensed on the spectroscope 80, and a Raman spectroscopic spectrum is detected. Other configurations are the same as those of the scanning probe microscope 100 shown in FIG. 1, and thus the description thereof will be omitted.

According to the scanning probe microscope 300 of the second modification, since scattered light can be collected from multiple directions, it is possible to perform measurement that is hard to be influenced by a shape of the sample 10.

<Configuration of Cantilever in Embodiment>

The intensity of the Raman scattered light is extremely weak compared to the intensity of the Rayleigh scattered light, and is stronger according to the intensity of the near-field light, and therefore, from the viewpoint of improving the detection sensitivity for the Raman scattered light, it is important to increase the intensity of the near-field light formed at the tip of the probe portion of the cantilever.

In this regard, in the present embodiment, by devising the ingenuity regarding the shape of the probe portion of the cantilever, which is a component of the scanning probe microscope, and devising a method of irradiating the probe portion of the cantilever with the excitation light, the intensity of the near-field formed at the tip of the probe portion is increased. Hereinafter, a configuration of the cantilever according to the present embodiment to which the ingenuity is devised will be described.

Figure 4:
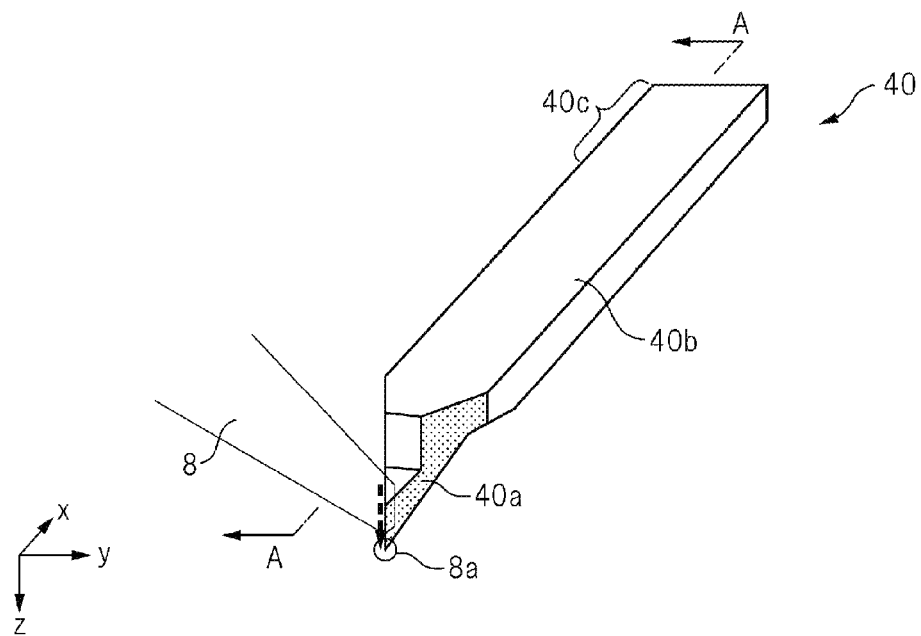
FIG. 4 is a perspective view showing a schematic configuration of a cantilever according to the embodiment.

FIG. 4 is a perspective view showing the schematic configuration of the cantilever according to the present embodiment.

In FIG. 4, the cantilever 40 according to the present embodiment is used, for example, in the scanning probe microscope shown in FIGS. 1 to 3. The cantilever 40 includes the held portion 40c held by a head of the scanning probe microscope, the beam portion 40b formed integrally with the held portion 40c, and the probe portion 40a supported by the beam portion 40b. The beam portion 40b extends in an x direction and is configured to be deformable. On the other hand, the probe portion 40a has, for example, a substantially triangular pyramid shape protruding in a z direction. However, the shape of the probe portion 40a is not limited to the substantially triangular pyramid shape, and can be, for example, a substantially quadrangular pyramid shape.

When the probe portion 40a of the cantilever 40 configured as described above is irradiated with excitation light 8, near-field light 8a is generated at the tip of the probe portion 40a.

Here, in FIG. 4, an x axis is defined as an axis parallel to an extending direction of the beam portion 40b. On the other hand, a y axis is defined as an axis which is on a virtual plane including the x axis and which is parallel to a normal line of the virtual plane on which the cantilever 40 is plane-symmetrical. Further, a z axis is defined as an axis orthogonal to both the x axis and the y axis defined as described above.

Figure 5:
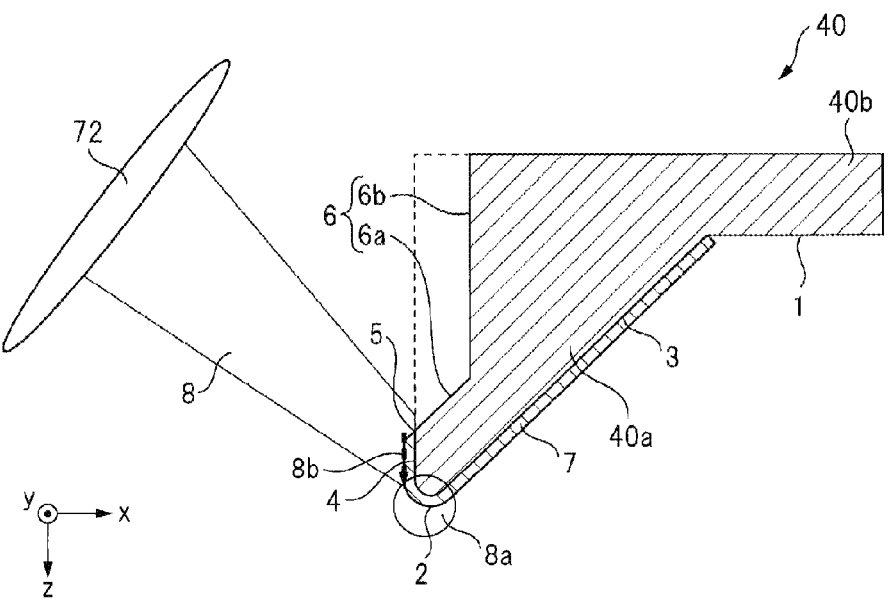
FIG. 5 is a cross sectional view taken along a line A-A in FIG. 4.

FIG. 5 is a cross sectional view taken along a line A-A in FIG. 4. That is, FIG. 5 can also be referred to as a cross sectional view taken along a virtual plane including a ridge forming a part of the probe portion 40a of the cantilever 40 and orthogonal to an upper surface of the beam portion 40b of the cantilever 40.

In FIG. 5, the probe portion 40a of the cantilever 40 according to the present embodiment has a vertex portion 2 that is a portion close to the sample and is covered by a metallic film 7, a ridge 4 that is connected to the vertex portion 2 and is covered by the metallic film 7, and an upper corner portion 5 that is connected to the ridge 4. In particular, at least one ridge 4 is present at the tip of the probe portion 40a. Further, the cantilever 40 according to the present embodiment includes the beam portion 40b that is connected to the probe portion 40a from a lower surface 1 and holds the probe portion 40a. Here, in FIG. 5, the probe portion 40a includes a first line 3 connecting the vertex portion 2 and the beam portion 40b, and a second line 6 connecting the upper corner portion 5 and the upper surface of the beam portion 40b. At this time, as shown in FIG. 5, the first line 3 is formed of a straight portion directly connected to the beam portion 40b. On the other hand, the second line 6 includes an inclined portion 6a directly connected to the upper corner portion 5, and a straight portion 6b connecting the inclined portion 6a and the upper surface of the beam portion 40b. In the cantilever 40 according to the present embodiment configured as described above, as shown in FIG. 5, the excitation light 8 condensed by the lens 72 is emitted to the ridge 4 from an oblique direction. Then, the excitation light 8 emitted from an excitation light source mounted on a scanning probe microscope system is emitted to a part of the ridge 4 and the upper corner portion 5 of the probe portion 40a. That is, in the cantilever 40 according to the present embodiment, the ridge 4 and the upper corner portion 5 forming a part of the probe portion 40a are portions irradiated with the excitation light 8. In other words, in the cantilever 40 according to the present embodiment, at least a part of the ridge 4 and the upper corner portion 5 are included in an irradiation spot of the excitation light 8 condensed by the lens 72.

Here, a material of the probe portion 40a of the cantilever 40 is generally silicon (Si), and the probe portion 40a can also be formed of silicon oxide ($SiO_2$), silicon nitride ($Si_3N_4$), carbon (C), or the like.

Further, the metallic film 7 covering the vertex portion 2 and the ridge 4 of the probe portion 40a can be formed of a metallic film such as a gold film, a silver film, a platinum film, or an aluminum film, an alloy film, or a multilayer film of a plurality of metals. A film thickness of the metallic film 7 is basically not limited, and is preferably, for example, 0.1 times or more a wavelength of the excitation light 8. However, since it is desirable to maintain a diameter of the tip of the probe portion 40a small in order to secure the intensity of the near-field light 8a excited at the tip, it is not desirable that the film thickness of the metallic film 7 is too thick. Therefore, the film thickness of the metallic film 7 may be set according to the purpose of measurement.

Next, in FIG. 5, the upper corner portion 5 and the second line 6 are formed on the probe portion 40a by focused ion beam (FIB) processing. At this time, silicon, which is a constituent material of the probe portion 40a, is exposed at the upper corner portion 5. Then, in the cantilever 40 according to the present embodiment, a length of the ridge 4 is extremely short. For example, the length of the ridge 4 is equal to or less than 10 times the wavelength of the excitation light 8 incident on the probe portion 40a of the cantilever 40. As a specific example, when the wavelength of the excitation light 8 is 660 nm, the length of the ridge 4 is 6.6 μm or less. In other words, a beam spot diameter of the excitation light 8 with which the probe portion 40a is irradiated is larger than the length of the ridge 4. In other words, the length of the ridge 4 is smaller than the beam spot diameter of the excitation light 8 with which the probe portion 40a is irradiated.

When the cantilever 40 according to the present embodiment is used in the scanning probe microscope, as shown in FIG. 5, the excitation light 8 condensed by the lens 72 is emitted from the front (the direction facing the ridge 4) of the cantilever 40. At this time, when an incident angle of the excitation light 8 with respect to the ridge 4 is θ, θ is larger than 0 degrees and smaller than 90 degrees. As a specific example, θ is 45 degrees.

<Features of Embodiment>

Next, feature points of the present embodiment will be described.

A first feature point in the present embodiment is that, for example, as shown in FIG. 5, the probe portion 40a of the cantilever 40 includes the vertex portion 2, the ridge 4, and the upper corner portion 5. That is, the first feature point of the present embodiment is a point of devising the ingenuity regarding the shape of the probe portion 40a of the cantilever 40, and is that the shape of the probe portion 40a is processed to dispose the upper corner portion 5 close to the vertex portion 2 such that the length of the ridge 4 is shortened.

Accordingly, as shown in FIG. 5, by irradiating the ridge 4 and the upper corner portion 5 of the probe portion 40a with the excitation light 8, surface plasmon 8b (collective vibration of free electrons forming the metallic film 7) is excited on a surface of the metallic film 7 covering the ridge 4. Then, the excited surface plasmon 8b propagates toward the vertex portion 2 of the probe portion 40a, and in the present embodiment, since the length of the ridge 4 is short, it is possible to efficiently propagate the surface plasmon 8b to the vertex portion 2 without reducing the surface plasmon 8b. As a result, local electric field concentration occurs at the vertex portion 2 of the probe portion 40a, and the extremely strong near-field light 8a is generated. That is, in the present embodiment, as a result of emitting the excitation light to the probe portion of the cantilever by the light source of the measurement device in which the cantilever is disposed, free electrons move from the upper corner portion 5 to the vertex portion 2 along the ridge 4, and electric field concentration occurs at the vertex portion 2. At this time, in order to strengthen the combination between the excitation light 8 and the surface plasmon 8b and to concentrate the surface plasmon 8b on the vertex portion 2, it is desirable that a polarization direction of the excitation light 8 has a large amount of component (p-polarized component) parallel to the ridge 4.

Subsequently, a second feature point in the present embodiment is that, for example, as shown in FIG. 5, the cantilever 40 is irradiated with the excitation light 8 from the oblique direction with respect to the ridge 4 of the probe portion 40a. In this case, the extremely strong surface plasmon 8b can be excited on the surface of the metallic film 7 covering the ridge 4. That is, when the ridge 4 is irradiated with the excitation light 8 from the oblique direction, the extremely strong surface plasmon 8b is excited on the surface of the metallic film 7 covering the ridge 4. As a result, energy of the surface plasmon 8b carried to the vertex portion 2 is increased, and thus it is possible to generate the extremely strong near-field light 8a in a region in the vicinity of the vertex portion 2. From the above, by combining the first feature point and the second feature point described above, it is possible to excite the surface plasmon 8b having extremely strong energy on the surface of the metallic film 7 covering the ridge 4. As a result, the extremely strong near-field light 8a can be generated in the vicinity of the vertex portion 2 of the probe portion 40a by a synergistic effect of the first feature point and the second feature point. This means that the intensity of the Raman scattered light from the sample can be increased, and therefore, according to the scanning probe microscope using the cantilever 40 in the present embodiment, a remarkable effect that the measurement sensitivity of the Raman scattered light can be greatly improved can be obtained.

For example, in a measurement technique in which only the tip of the probe portion 40a is irradiated with the excitation light 8, only a part of the excitation light 8 can be converted into the near-field light 8a. Therefore, it is difficult to maximize the energy of the excitation light 8 to generate the near-field light 8a. Further, when the length of the ridge 4 is too long, a propagation distance of the surface plasmon 8b excited on the surface of the metallic film 7 covering the ridge 4 becomes long, and as a result, since the surface plasmon 8b is reduced due to a long propagation distance, the measurement sensitivity is not improved. In contrast, in the present embodiment, as shown in FIG. 5, the excitation light 8 condensed by the lens 72 is emitted to the ridge 4 and the upper corner portion 5 of the probe portion 40a, and the surface plasmon 8b is excited from the excitation light 8 emitted to the ridge 4. Then, the intensity of the near-field light 8a generated in the vicinity of the vertex portion 2 by the propagation of the energy of the surface plasmon 8b is increased. At this time, in the present embodiment, since the length of the ridge 4 is short, the reduction of the surface plasmon 8b is hard to occur, and the intensity of the near-field light 8a can be efficiently improved. That is, in the present embodiment, since the energy of the excitation light 8 can be used to the maximum through the propagation of the energy of the surface plasmon 8b, it is possible to generate the extremely strong near-field light 8a at the vertex portion 2 of the probe portion 40a. Therefore, according to the present embodiment, since the intensity of the near-field light 8a generated in the vicinity of the vertex portion 2 of the probe portion 40a can be improved, the measurement sensitivity can be improved.

Further, it is known that, in the general cantilever used in the scanning probe microscope, for example, the measurement sensitivity rapidly decreases due to contamination or oxidation of the surface of the metallic film covering the tip portion of the probe. For example, the life of the general cantilever is about several weeks at the maximum. In contrast, in the configuration of the invention, an area of the metallic film on which the surface plasmon can be excited is large, and it is extremely unlikely that the entire excited area is contaminated. Therefore, according to the cantilever 40 in the present embodiment, it has been confirmed that a long life can be realized. Therefore, it can be said that the cantilever 40 in the present embodiment is not only useful from the viewpoint that the measurement sensitivity can be greatly improved, but also extremely excellent from the viewpoint that a highly reliable and long-lived cantilever can be provided.

<Modifications>

<<First Modification>>

Figure 6:
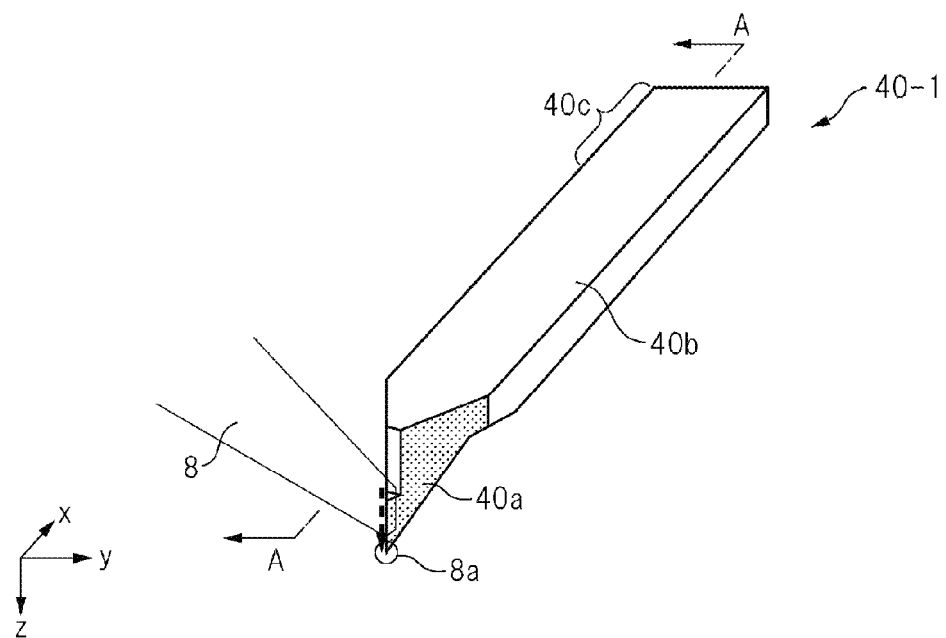
FIG. 6 is a perspective view showing a schematic configuration of a cantilever according to a first modification.

FIG. 6 is a perspective view showing a schematic configuration of a cantilever according to a first modification.

In FIG. 6, a cantilever 40-1 according to the first modification is also used in, for example, the scanning probe microscope shown in FIGS. 1 to 3. The cantilever 40-1 includes the held portion 40c held by the head of the scanning probe microscope, the beam portion 40b formed integrally with the held portion 40c, and the probe portion 40a supported by the beam portion 40b. The beam portion 40b extends in the x direction and is configured to be deformable. On the other hand, the probe portion 40a has, for example, a substantially triangular pyramid shape protruding in the z direction. However, the shape of the probe portion 40a is not limited to the substantially triangular pyramid shape, and can be, for example, a substantially quadrangular pyramid shape.

When the probe portion 40a of the cantilever 40-1 configured as described above is irradiated with the excitation light 8, the near-field light 8a is generated at the tip of the probe portion 40a.

Figure 7:
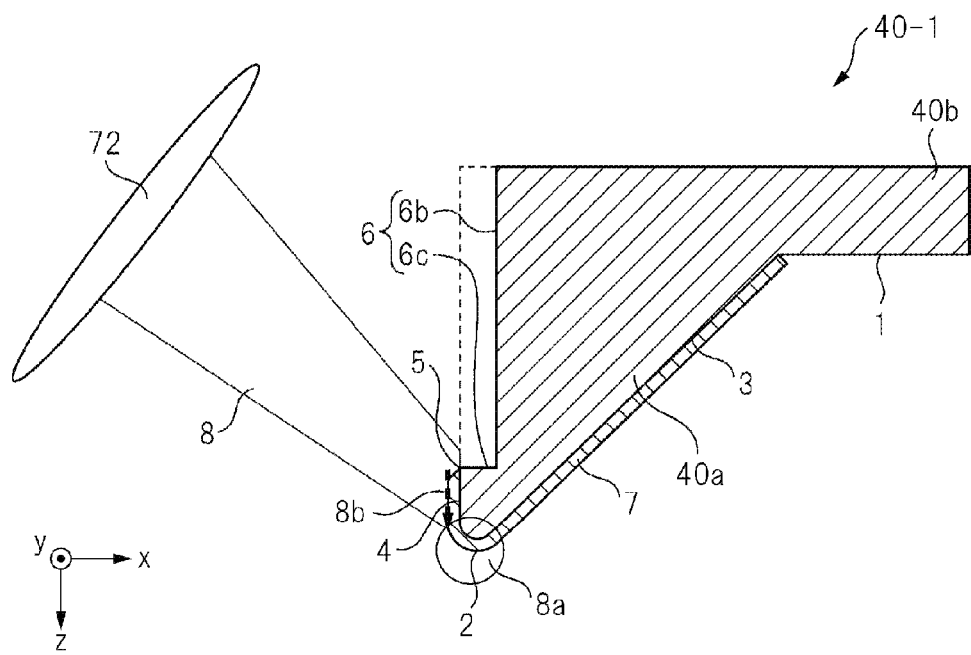
FIG. 7 is a cross sectional view taken along a line A-A in FIG. 6.

FIG. 7 is a cross sectional view taken along a line A-A in FIG. 6.

In FIG. 7, the probe portion 40a includes the first line 3 connecting the vertex portion 2 and the beam portion 40b, and the second line 6 connecting the upper corner portion 5 and the upper surface of the beam portion 40b. At this time, as shown in FIG. 7, the first line 3 is formed of a straight portion directly connected to the beam portion 40b. On the other hand, the second line 6 includes a horizontal straight portion 6c directly connected to the upper corner portion 5, and the straight portion 6b connecting the horizontal straight portion 6c and the upper surface of the beam portion 40b.

Also in the cantilever 40-1 according to the first modification configured as described above, as shown in FIG. 7, the excitation light 8 condensed by the lens 72 is emitted to the ridge 4 from the oblique direction. Then, the excitation light 8 emitted from the light source of the scanning probe microscope is emitted to a part of the ridge 4 and the upper corner portion 5 of the probe portion 40a. Accordingly, the cantilever 40-1 according to the first modification can also improve the intensity of the near-field light 8a generated in the vicinity of the vertex portion 2 of the probe portion 40a, similar to the cantilever 40 according to the embodiment.

<<Second Modification>>

Figure 8:
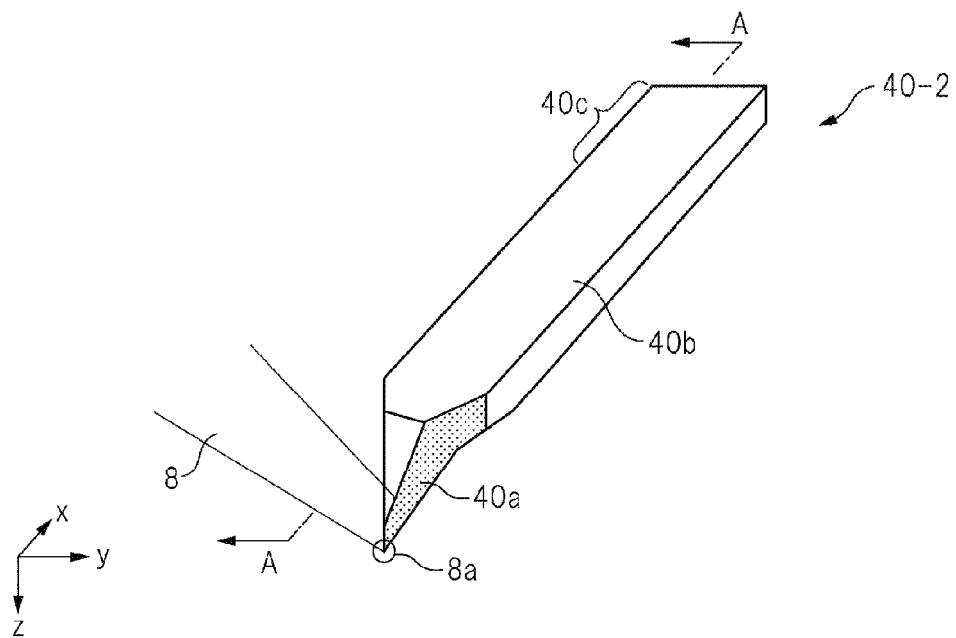
FIG. 8 is a perspective view showing a schematic configuration of a cantilever according to a second modification.

FIG. 8 is a perspective view showing a schematic configuration of a cantilever according to a second modification.

In FIG. 8, a cantilever 40-2 according to the second modification is also used in, for example, the scanning probe microscope shown in FIGS. 1 to 3. The cantilever 40-2 includes the held portion 40c held by the head of the scanning probe microscope, the beam portion 40b formed integrally with the held portion 40c, and the probe portion 40a supported by the beam portion 40b. The beam portion 40b extends in the x direction and is configured to be deformable. On the other hand, the probe portion 40a has, for example, a substantially triangular pyramid shape protruding in the z direction. However, the shape of the probe portion 40a is not limited to the substantially triangular pyramid shape, and can be, for example, a substantially quadrangular pyramid shape.

When the probe portion 40*a* of the cantilever 40-2 configured as described above is irradiated with the excitation light 8, the near-field light 8*a* is generated at the tip of the probe portion 40*a*.

Figure 9:
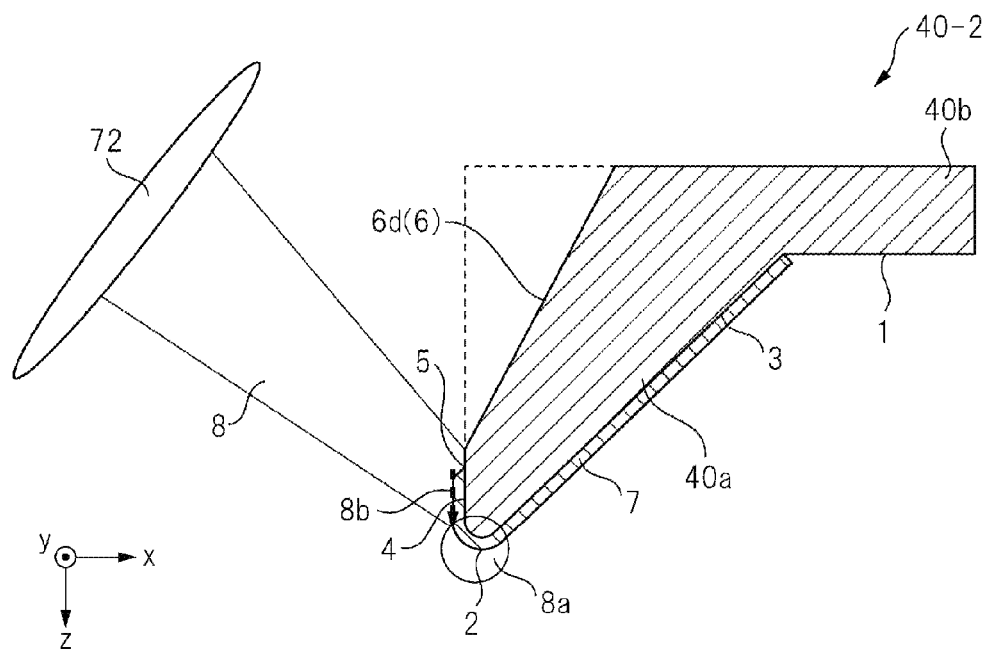
FIG. 9 is a cross sectional view taken along a line A-A in FIG. 8.

FIG. 9 is a cross sectional view taken along a line A-A in FIG. 8.

In FIG. 9, the probe portion 40*a* includes the first line 3 connecting the vertex portion 2 and the beam portion 40*b*, and the second line 6 connecting the upper corner portion 5 and the upper surface of the beam portion 40*b*. At this time, as shown in FIG. 9, the first line 3 is formed of a straight portion directly connected to the beam portion 40*b*. On the other hand, the second line 6 is formed by an inclined straight portion 6*d* directly connected to both the upper corner portion 5 and the upper surface of the beam portion 40*b*.

Also in the cantilever 40-2 according to the second modification configured as described above, as shown in FIG. 9, the excitation light 8 condensed by the lens 72 is emitted to the ridge 4 from the oblique direction. Then, the excitation light 8 emitted from the light source of the scanning probe microscope is emitted to a part of the ridge 4 and the upper corner portion 5 of the probe portion 40*a*. Accordingly, the cantilever 40-2 according to the second modification can also improve the intensity of the near-field light 8*a* generated in the vicinity of the vertex portion 2 of the probe portion 40*a*, similar to the cantilever 40 according to the embodiment.

In particular, in the cantilever 40-2 according to the second modification, since the second line 6 is formed of only the inclined straight portion 6*d* having a constant inclination, there is an advantage that FIB processing is easily performed.

<<Third Modification>>

Figure 10:
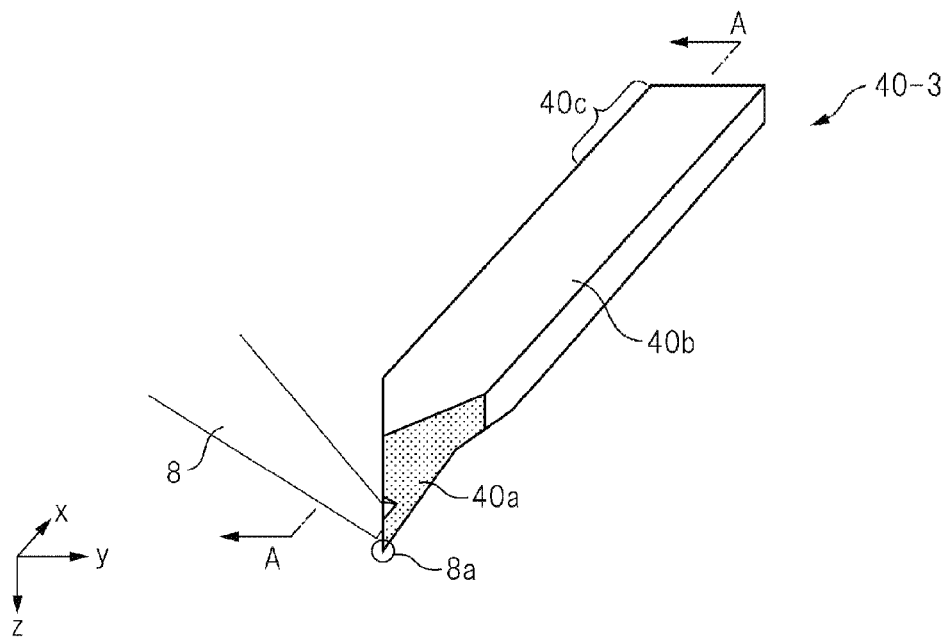
FIG. 10 is a perspective view showing a schematic configuration of a cantilever according to a third modification.

FIG. 10 is a perspective view showing a schematic configuration of a cantilever according to a third modification.

In FIG. 10, a cantilever 40-3 according to the third modification is also used in, for example, the scanning probe microscope shown in FIGS. 1 to 3. The cantilever 40-3 includes the held portion 40*c* held by the head of the scanning probe microscope, the beam portion 40*b* formed integrally with the held portion 40*c*, and the probe portion 40*a* supported by the beam portion 40*b*. The beam portion 40*b* extends in the x direction and is configured to be deformable. On the other hand, the probe portion 40*a* has, for example, a substantially triangular pyramid shape protruding in the z direction. However, the shape of the probe portion 40*a* is not limited to the substantially triangular pyramid shape, and can be, for example, a substantially quadrangular pyramid shape.

When the probe portion 40*a* of the cantilever 40-3 configured as described above is irradiated with the excitation light 8, the near-field light 8*a* is generated at the tip of the probe portion 40*a*.

Figure 11:
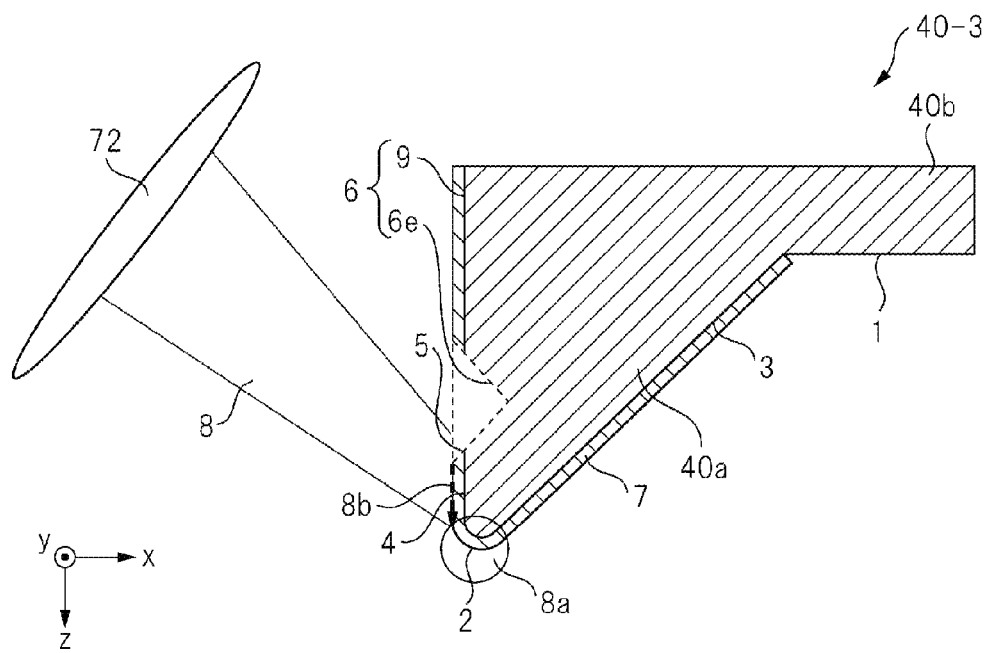
FIG. 11 is a cross sectional view taken along a line A-A in FIG. 10.

FIG. 11 is a cross sectional view taken along a line A-A in FIG. 10.

In FIG. 11, the probe portion 40*a* includes the first line 3 connecting the vertex portion 2 and the beam portion 40*b*, and the second line 6 connecting the upper corner portion 5 and the upper surface of the beam portion 40*b*. At this time, as shown in FIG. 11, the first line 3 is formed of a straight portion directly connected to the beam portion 40*b*. On the other hand, the second line 6 includes an extension line portion 9 located on an extension of the ridge 4, and a first recessed portion 6*e*, which is connected to the upper corner portion 5 and the extension line portion 9 and is recessed toward the first line 3 side.

Also in the cantilever 40-3 according to the third modification configured as described above, as shown in FIG. 11, the excitation light 8 condensed by the lens 72 is emitted to the ridge 4 from the oblique direction. Then, the excitation light 8 emitted from the light source of the scanning probe microscope is emitted to a part of the ridge 4 and the upper corner portion 5 of the probe portion 40*a*. Accordingly, the cantilever 40-3 according to the third modification can also improve the intensity of the near-field light 8*a* generated in the vicinity of the vertex portion 2 of the probe portion 40*a*, similar to the cantilever 40 according to the embodiment.

In particular, in the cantilever 40-3 according to the third modification, since a volume of the first recessed portion 6*e* formed by the FIB processing is small, a time required for the FIB processing can be shortened.

<<Fourth Modification>>

Figure 12:
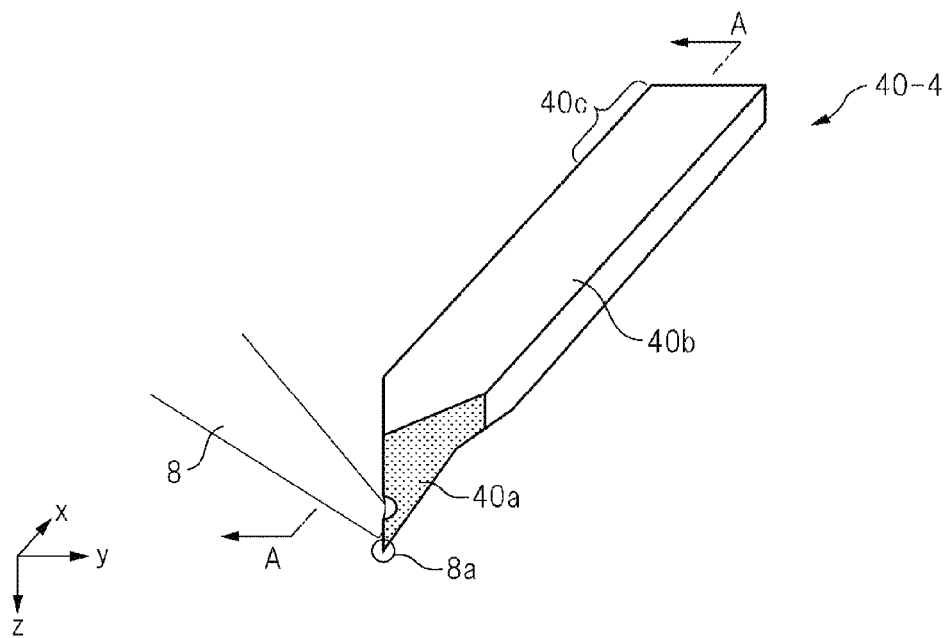
FIG. 12 is a perspective view showing a schematic configuration of a cantilever according to a fourth modification.

FIG. 12 is a perspective view showing a schematic configuration of a cantilever according to a fourth modification.

In FIG. 12, a cantilever 40-4 according to the fourth modification is also used in, for example, the scanning probe microscope shown in FIGS. 1 to 3. The cantilever 40-4 includes the held portion 40*c* held by the head of the scanning probe microscope, the beam portion 40*b* formed integrally with the held portion 40*c*, and the probe portion 40*a* supported by the beam portion 40*b*. The beam portion 40*b* extends in the x direction and is configured to be deformable. On the other hand, the probe portion 40*a* has, for example, a substantially triangular pyramid shape protruding in the z direction. However, the shape of the probe portion 40*a* is not limited to the substantially triangular pyramid shape, and can be, for example, a substantially quadrangular pyramid shape.

When the probe portion 40*a* of the cantilever 40-4 configured as described above is irradiated with the excitation light 8, the near-field light 8*a* is generated at the tip of the probe portion 40*a*.

Figure 13:
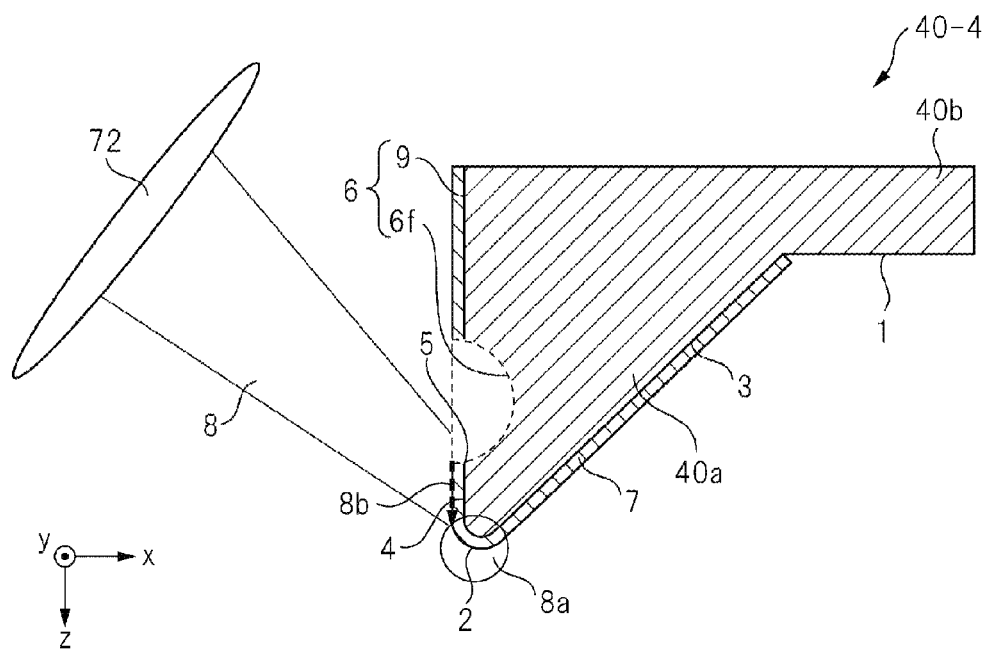
FIG. 13 is a cross sectional view taken along a line A-A in FIG. 12.

FIG. 13 is a cross sectional view taken along a line A-A in FIG. 12.

In FIG. 13, the probe portion 40*a* includes the first line 3 connecting the vertex portion 2 and the beam portion 40*b*, and the second line 6 connecting the upper corner portion 5 and the upper surface of the beam portion 40*b*. At this time, as shown in FIG. 13, the first line 3 is formed of a straight portion directly connected to the beam portion 40*b*. On the other hand, the second line 6 includes the extension line portion 9 located on the extension of the ridge 4, and a second recessed portion 6*f*, which is connected to the upper corner portion 5 and the extension line portion 9 and is curved toward the first line 3 side.

Also in the cantilever 40-4 according to the fourth modification configured as described above, as shown in FIG. 13, the excitation light 8 condensed by the lens 72 is emitted to the ridge 4 from the oblique direction. Then, the excitation light 8 emitted from the light source of the scanning probe microscope is emitted to a part of the ridge 4 and the upper corner portion 5 of the probe portion 40*a*. Accordingly, the cantilever 40-4 according to the fourth modification can also improve the intensity of the near-field light 8*a* generated in the vicinity of the vertex portion 2 of the probe portion 40*a*, similar to the cantilever 40 according to the embodiment.

In particular, in the cantilever 40-4 according to the fourth modification, since a volume of the second recessed portion 6f formed by the FIB processing is small, a time required for the FIB processing can be shortened.

<Superordinate Conception of Cantilever>

As described above, the configurations of the cantilever in which a technical idea in the present embodiment is embodied include, for example, the configuration shown in FIG. 5, the configuration shown in FIG. 7, the configuration shown in FIG. 9, the configuration shown in FIG. 11, and the configuration shown in FIG. 13. Here, for example, when a configuration including the configuration shown in FIG. 5, the configuration shown in FIG. 7, and the configuration shown in FIG. 9 is referred to as a first configuration, the first configuration can be understood as a configuration described below. That is, the first configuration can be said to be a configuration in which, in FIGS. 5, 7, and 9, on the premise that the probe portion 40a includes the vertex portion 2, the first line 3, the ridge 4, the upper corner portion 5, and the second line 6, and the second line 6 includes the straight portion (the straight portion 6b, the inclined straight portion 6d) directly connected to the upper surface of the beam portion 40b, an interval between the first line 3 and the straight portion (the straight portion 6b, the inclined straight portion 6d) of the second line 6 becomes the same as or narrower as approaching the vertex portion 2. Accordingly, it can be said that the first configuration is a superordinate conceptual configuration including the configuration shown in FIG. 5, the configuration shown in FIG. 7, and the configuration shown in FIG. 9. According to the first configuration, the rigidity of the cantilever around the y axis can be increased. Therefore, the first configuration can prevent vibration caused by the shape of the cantilever.

Subsequently, for example, when the configuration including the configuration shown in FIG. 11 and the configuration shown in FIG. 13 is referred to as a second configuration, the second configuration can be understood as a configuration shown below. That is, the second configuration can be said to be a configuration in which, in FIGS. 11 and 13, on the premise that the probe portion 40a includes the vertex portion 2, the first line 3, the ridge 4, the upper corner portion 5, and the second line 6, the second line 6 includes the extension line portion 9 located on the extension of the ridge 4, and the recessed portion (the first recessed portion 6e and the second recessed portion 6f) that is connected to both the upper corner portion 5 and the extension line portion 9 and is recessed toward the first line 3 side. Accordingly, it can be said that the second configuration is a superordinate conceptual configuration including the configuration shown in FIG. 11 and the configuration shown in FIG. 13. According to the second configuration, the technical idea of the present embodiment can be realized more easily. Further, according to the second configuration, since a position at which the recessed portion (the first recessed portion 6e and the second recessed portion 6f) is formed can be easily adjusted in accordance with condensing characteristics of the excitation light of the scanning probe microscope by the lens, it is possible to obtain versatility that the second configuration can be applied to the cantilever for a wider variety of types of scanning probe microscopes. Further, since the processed portion is extremely small, an influence on vibration characteristics of the cantilever is small, and the cantilever can be used as it is in the related art.

<Verification of Effect>

According to the present embodiment, an effect of improving the intensity of the near-field light generated at the tip of the probe portion can be obtained, and a verification result of the effect will be described.

Figure 14:
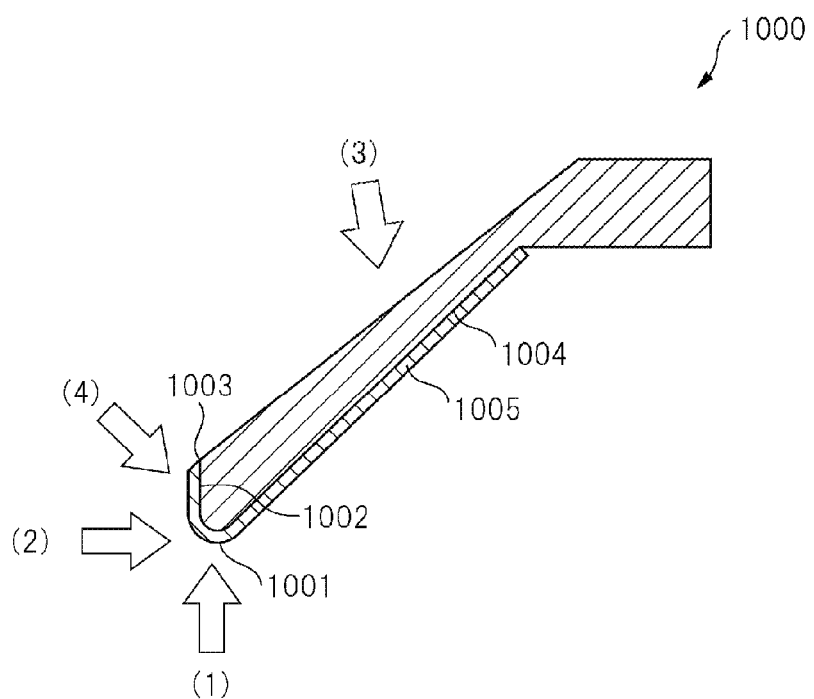
FIG. 14 is a diagram schematically showing a simulation calculation model for verifying an effect in the embodiment.

FIG. 14 is a diagram schematically showing a simulation calculation model for verifying the effect in the present embodiment. FIG. 14 shows a schematic probe portion 1000 used in the simulation calculation model. The probe portion 1000 includes a vertex portion 1001, a ridge 1002, an upper corner portion 1003, and a first line 1004. Then, in FIG. 14, "(1)" indicates a case where the vertex portion 1001 is irradiated with excitation light from below (downward irradiation), and "(2)" indicates a case where the vertex portion 1001 is irradiated with excitation light from a side (lateral irradiation). Further, in FIG. 14, "(3)" indicates a case where excitation light is emitted from a rear surface side of the first line 1004 (backside irradiation), and "(4)" indicates a case where excitation light is emitted from an oblique direction with respect to the ridge 1002 (oblique irradiation). Here, the case of "(4)" corresponds to a proposed method in the present embodiment. In the calculation of the simulation, the excitation light with which the probe portion 1000 is irradiated is a Gaussian beam having a diameter of 3 μm, polarized light is P-polarized light, and an incident power is set to 1 W. Further, a base material of the probe portion 1000 is silicon, and a film thickness of a metallic film 1005 is set to about 100 nm on the ridge 1002 side and about 45 nm on the first line 1004 side.

Figure 15:
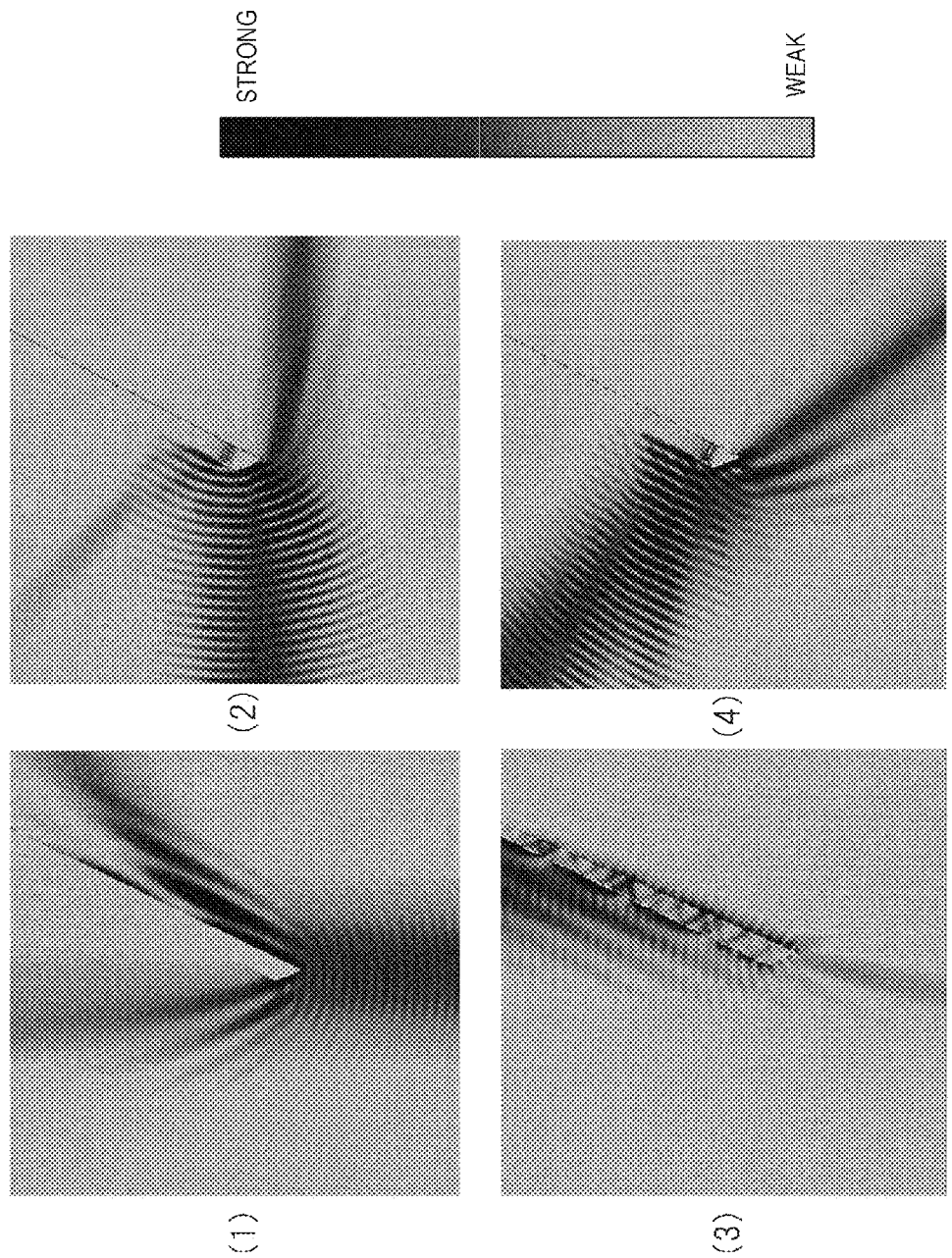
FIG. 15 is a simulation result of an entire probe portion.

Hereinafter, a generation situation of the near-field light calculated by the simulation calculation model described above will be described. FIG. 15 shows a simulation result of the entire probe portion. On the other hand, FIG. 16 shows a simulation result when the vicinity of the tip of the probe portion is enlarged, and FIG. 17 shows a simulation result when image processing is performed such that the electric field intensity in the vicinity of the tip of the probe portion can be easily grasped. FIGS. 15 and 16 show that the blacker the region, the higher the electric field intensity. In FIG. 17, focusing on the tip of the probe portion, the electric field intensity increases in an order of "white", "black", and "gray". Then, in each of FIGS. 15 to 17, "(1)" indicates downward irradiation, and "(2)" indicates lateral irradiation. Further, in each of FIGS. 15 to 17, "(3)" indicates backside irradiation, and "(4)" indicates oblique irradiation. For example, it can be seen that, as shown in FIG. 17, in the oblique irradiation corresponding to the proposed method in the present embodiment, a maximum electric field intensity of the near-field light in the region in the vicinity of the tip of the probe portion is 15.8 $(V/m)^2$, and as compared with the downward irradiation shown in (1), the lateral irradiation shown in (2), and the backside irradiation shown in (3), a maximum electric field intensity of 2 times or more is realized. Therefore, for example, since a signal intensity of the Raman spectroscopy is proportional to the fourth power of the intensity of the near-field light, it can be estimated that when the probe-enhanced Raman spectroscopy is performed by using the near-field light generated by the oblique irradiation (4), an amplification of the fourth power of the measurement sensitivity by the other irradiation methods can be obtained. Thus, in consideration of the verification result by the simulation calculation model described above, according to the present embodiment, it is confirmed that it is possible to improve the intensity of the near-field light generated at the tip of the probe portion, and as a result, for example, it is possible to improve the measurement sensitivity for the probe-enhanced Raman spectroscopy.

<Consideration on Length of Ridge>

Figure 18A:
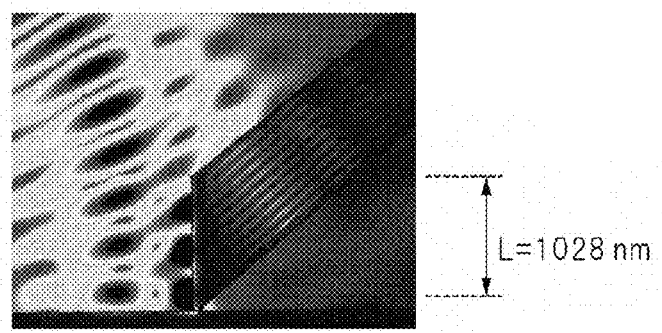
FIGS. 18A to 18B are a diagram showing that an electric field distribution caused by surface plasmon formed on a ridge differs depending on a difference in a length of the ridge in the probe portion, in which 18A is a diagram showing an electric field distribution when a length L of the ridge is L=1028 nm, and 18B is a diagram showing an electric field distribution when the length L of the ridge is 4820 nm.
Figure 18B:
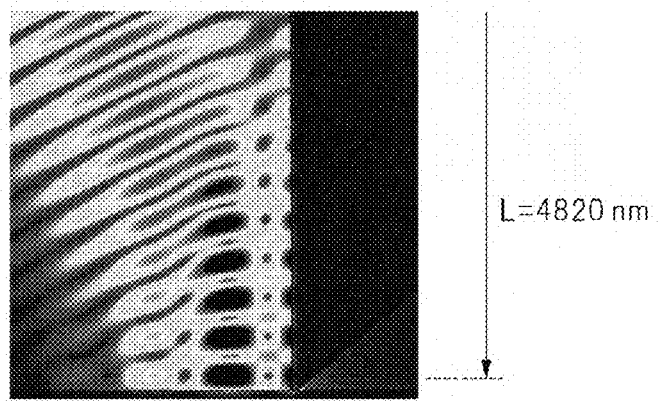

Next, consideration of a length of a ridge will be described. FIGS. 18A to 18B are a diagram showing that an electric field distribution caused by surface plasmon formed on the ridge differs depending on a difference in the length of the ridge in the probe portion. For example, FIG. 18A shows the electric field distribution when a length L of the ridge is L=1028 nm. On the other hand, FIG. 18B shows the electric field distribution when the length L of the ridge is L=4820 nm.

From this simulation result, it is possible to understand the necessity of defining the length of the ridge. That is, in FIG. 18A, surface plasmon is excited and confined on the surface of the metallic film covering the ridge, and as a result, standing waves are generated by the surface plasmon. Accordingly, local electric field concentration occurs at the vertex portion of the probe portion, and extremely strong near-field light is generated. For example, in FIG. 18A, the electric field intensity of the near-field light generated at the vertex portion of the probe portion is 21.5 (V/m). On the other hand, when the length of the ridge is too long as shown in FIG. 18B, a confinement effect of the surface plasmon is weakened. As a result, the electric field intensity of the generated near-field light is relatively weak at the vertex portion of the probe portion. For example, in FIG. 18B, the electric field intensity of the near-field light generated at the vertex portion of the probe portion is 13.9 (V/m). An incident electric field intensity during simulation calculation is 1 (V/m).

From the above, it can be seen that in order to increase the electric field intensity of the near-field light at the vertex portion of the probe portion, it is desirable to limit the length of the ridge in the probe portion to a predetermined first specified value or less. That is, in order to effectively use the local electric field concentration due to the surface plasmon, the length of the ridge has an upper limit value. On the other hand, when the length of the ridge is too short, it is considered that the standing waves due to the surface plasmon cannot be generated, and therefore, it is desirable to limit the length of the ridge to a predetermined second specified value or more in order to effectively use the local electric field concentration due to the surface plasmon. That is, in order to effectively use the local electric field concentration due to the surface plasmon, the length of the ridge has a lower limit value. As described above, it can be seen that the electric field intensity of the near-field light at the vertex portion of the probe portion qualitatively depends on the length of the ridge, and from the viewpoint of increasing the electric field intensity of the near-field light, it is desirable to limit the length of the ridge to a predetermined range (the second specified value or more and the first specified value or less).

Figure 19A:
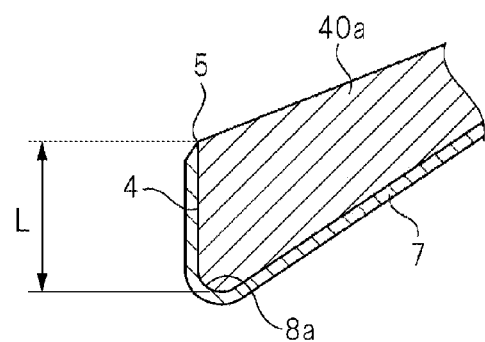
FIG. 19A is a diagram showing a tip structure of the probe portion.
Figure 19B:
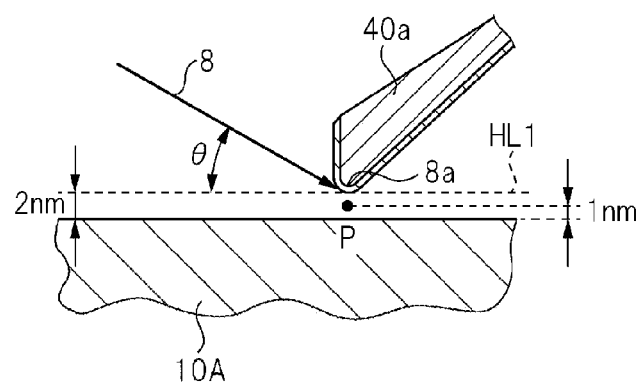
FIG. 19B is a diagram showing a premise configuration for performing a first simulation.

Therefore, in the following, a simulation result of calculating a change in the electric field intensity of the near-field light when the length of the ridge is changed will be described. For example, FIGS. 19A-19B are a diagram showing preconditions in a first simulation for calculating the change in the electric field intensity of the near-field light when the length of the ridge is changed. FIG. 19A shows a tip structure of the probe portion 40a. In FIG. 19A, a line connecting a vertex portion 8a and the upper corner portion 5 is the ridge 4, and the length of the ridge 4 is indicated by "L". In the first simulation, "L" is changed.

Then, FIG. 19B is a diagram showing a premise configuration for performing the first simulation. As shown in FIG. 19B, the vertex portion 8a of the probe portion 40a is irradiated with the excitation light 8. At this time, the wavelength of the excitation light 8 is 660 nm. The excitation light 8 is condensed into a spot shape and is emitted to the vertex portion 8a of the probe portion 40a. Specifically, the vertex portion 8a is irradiated with a center of the spot shape, and a range of the spot shape includes the ridge 4 and the upper corner portion 5. Then, in FIG. 19B, in the first simulation, an angle formed by a horizontal line HL1 passing through the vertex portion 8a and an incident direction of the excitation light 8 is defined as an incident angle θ. Further, the electric field intensity of the near-field light calculated in the first simulation is an electric field intensity at a position indicated by "P" in FIG. 19B. That is, in the first simulation, a gold substrate 10A is disposed below the probe portion 40a, and a gap of 2 nm is present between the vertex portion 8a of the probe portion 40a and a surface of the gold substrate 10A. Here, an intermediate point between the vertex portion 8a and the surface of the gold substrate 10A is "P", and a distance between "P" and the gold substrate 10A is 1 nm.

In the first simulation, since the vertex portion 8a is irradiated with the excitation light 8, a range of the incident angle θ is 0° or more and 90° or less in consideration that the incident angle θ cannot be 90° or more. However, in an actual scanning probe microscope, the incident angle θ is limited to 15° or more and 90° or less in order to avoid physical interference between the gold substrate 10A and the incident optical system that condenses the excitation light 8 into a spot shape.

Figure 20:
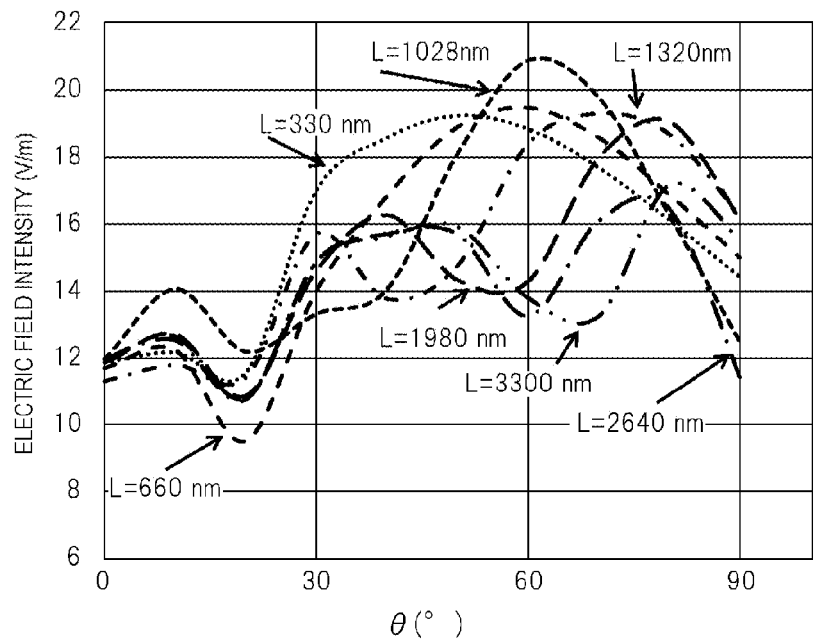
FIG. 20 is a graph showing a result of the first simulation.

FIG. 20 is a graph showing a result of the first simulation. In FIG. 20, a vertical axis represents the electric field intensity (V/m), and a horizontal axis represents the incident angle θ (°). FIG. 20 shows a relationship between the incident angle θ and the electric field intensity in a case where the length L of the ridge 4 is λ/2 (=330 nm) or more and 5λ (=3300 nm) or less when the wavelength of the excitation light is λ (=660 nm). As shown in FIG. 20, in any case where the length L of the ridge 4 is λ/2 or more and 5λ or less, there is an incident angle θ at which the electric field intensity takes a maximum value of, for example, 16 (V/m) or more. Therefore, in a case where the length L of the ridge 4 is in a range of λ/2 or more and 5λ or less, it is possible to increase the electric field intensity of the near-field light by determining the incident angle at which the electric field intensity is the maximum value with reference to FIG. 20. That is, based on the result of the first simulation, the electric field intensity of the near-field light depends on both the length L of the ridge 4 and the incident angle θ, and when the length L of the ridge 4 is λ/2 or more and 5λ or less, the electric field intensity of the near-field light can be increased by selecting an appropriate incident angle θ based on the graph shown in FIG. 20. That is, for example, the electric field intensity of the near-field light can be increased by adjusting the incident angle θ depending on a difference in the length L of the ridge 4. In other words, based on the result of the first simulation, the electric field intensity of the near-field light depends on both the length L of the ridge 4 and the incident angle θ, and for example, when the incident angle θ is determined, the electric field intensity of the near-field light can be increased by selecting an appropriate length L of the ridge 4 in a range of λ/2 or more and 5λ or less based on the graph shown in FIG. 20. Accordingly, by adjusting the incident angle θ according to the length L of the ridge 4 or selecting an appropriate length L of the ridge 4 according to the incident angle θ, for example, the measurement sensitivity of probe-enhanced Raman spectroscopy can be improved.

Next, a result of a second simulation will be described.

Figure 21:
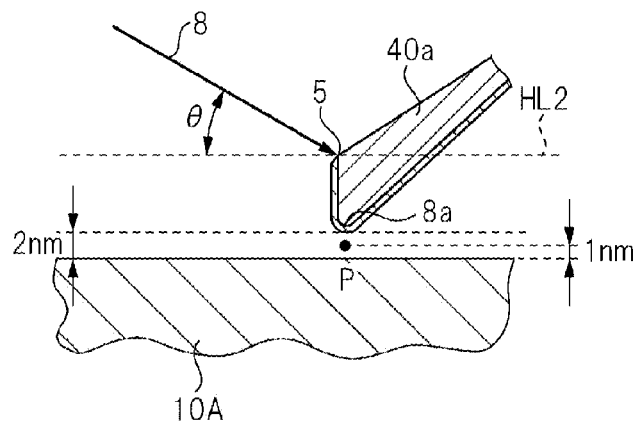
FIG. 21 is a diagram showing a premise configuration for performing a second simulation.

FIG. 21 is a diagram showing a premise configuration for performing the second simulation. As shown in FIG. 21, the upper corner portion 5 of the probe portion 40a is irradiated with the excitation light 8. At this time, the wavelength of the excitation light 8 is 660 nm. The excitation light 8 is condensed into a spot shape and is emitted to the upper corner portion 5 of the probe portion 40a. Specifically, the upper corner portion 5 is irradiated with a center of the spot shape, and a range of the spot shape includes the ridge 4 and the vertex portion 8a. Then, in FIG. 21, in the second simulation, an angle formed by a horizontal line HL2 passing through the upper corner portion 5 and the incident direction of the excitation light 8 is defined as the incident angle θ. Further, the electric field intensity of the near-field light calculated in the second simulation is an electric field intensity at a position indicated by "P" in FIG. 21. That is, in the second simulation, the gold substrate 10A is disposed below the probe portion 40a, and a gap of 2 nm is present between the upper corner portion 5 of the probe portion 40a and the surface of the gold substrate 10A. Here, an intermediate point between the upper corner portion 5 and the surface of the gold substrate 10A is "P", and a distance between "P" and the gold substrate 10A is 1 nm.

In the second simulation, since the upper corner portion 5 is irradiated with the excitation light 8, the range of the incident angle θ can be, for example, 0° or more and 130° or less in consideration that the incident angle θ may be 90° or more. However, in an actual scanning probe microscope, the incident angle θ is limited to, for example, 15° or more and 130° or less in order to avoid physical interference between the gold substrate 10A and the incident optical system that condenses the excitation light 8 into a spot shape.

Figure 22:
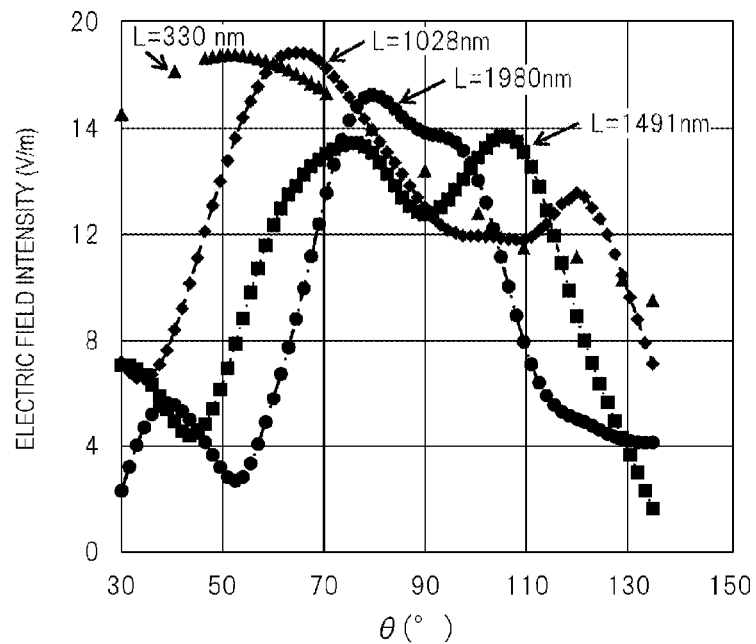
FIG. 22 is a graph showing a result of the second simulation.

FIG. 22 is a graph showing the result of the second simulation. In FIG. 22, a vertical axis represents the electric field intensity (V/m), and a horizontal axis represents the incident angle θ (°). FIG. 22 shows a relationship between the incident angle θ and the electric field intensity in a case where the length L of the ridge 4 is $\lambda/2$ (=330 nm) or more and $3\lambda$ (=1980 nm) or less when the wavelength of the excitation light is λ (=660 nm). As shown in FIG. 22, in any case where the length L of the ridge 4 is $\lambda/2$ or more and $3\lambda$ or less, there is an incident angle θ at which the electric field intensity takes a maximum value of, for example, 14 (V/m) or more. Therefore, in a case where the length L of the ridge 4 is in a range of $\lambda/2$ or more and $3\lambda$ or less, it is possible to increase the electric field intensity of the near-field light by determining the incident angle at which the electric field intensity is the maximum value with reference to FIG. 22. That is, based on the result of the second simulation, the electric field intensity of the near-field light depends on both the length L of the ridge 4 and the incident angle θ, and when the length L of the ridge 4 is $\lambda/2$ or more and $3\lambda$ or less, the electric field intensity of the near-field light can be increased by selecting an appropriate incident angle θ based on the graph shown in FIG. 22. That is, for example, the electric field intensity of the near-field light can be increased by adjusting the incident angle θ depending on a difference in the length L of the ridge 4. In other words, based on the result of the second simulation, the electric field intensity of the near-field light depends on both the length L of the ridge 4 and the incident angle θ, and for example, when the incident angle θ is determined, the electric field intensity of the near-field light can be increased by selecting an appropriate length L of the ridge 4 in a range of $\lambda/2$ or more and $3\lambda$ or less based on the graph shown in FIG. 22. Accordingly, by adjusting the incident angle θ according to the length L of the ridge 4 or selecting an appropriate length L of the ridge 4 according to the incident angle θ, for example, the measurement sensitivity of probe-enhanced Raman spectroscopy can be improved.

In the first simulation and the second simulation described above, although λ=660 nm has been described as an example of the wavelength λ of the excitation light 8, in the result of the first simulation and the result of the second simulation, for example, λ can be applied to a wavelength in a visible light region. However, the wavelength λ of the excitation light 8 is not limited to the wavelength in the visible light region, and can be widely applied from a wavelength in a near-ultraviolet region to a wavelength in an infrared region by changing the material of the metallic film 7 covering the probe portion 40a from a gold film (Au film) to a silver film (Ag film) or an aluminum film (Al film).

For example, when the wavelength in the infrared region is used for the excitation light 8, the measurement sensitivity of infrared (IR) spectroscopic measurement can also be made high by measuring, at a nano-resolution level, any one of expansion of a sample surface, a change in reflectance, and a light induced force due to irradiation of the excitation light 8 or irradiation of the near-field light generated by emitting the excitation light 8, in addition to the measurement of SNOM or TERS.

Next, based on the result of the first simulation and the result of the second simulation, an advantage of the configuration in which a spot center of the excitation light 8 is emitted on the vertex portion 8a of the probe portion 40a and an advantage of the configuration in which the spot center of the excitation light 8 is emitted on the upper corner portion 5 of the probe portion 40a will be described.

The result of the first simulation is a result for a configuration in which the vertex portion 8a of the probe portion 40a is irradiated with the spot center of the excitation light 8. For example, as can be seen from a comparison between FIG. 20 and FIG. 22, the electric field intensity of the near-field light in the first simulation is generally higher than the electric field intensity of the near-field light in the second simulation. In particular, in the first simulation, when the length L of the ridge 4 is L=1028 nm and the incident angle θ is θ=65°, the electric field intensity of the near-field light is 21 (V/m), which is the maximum value. Therefore, in the configuration in which the vertex portion 8a corresponding to the first simulation is irradiated with the spot center of the excitation light 8, an advantage is obtained in that a magnitude of the electric field intensity can be increased. Further, based on the result of the first simulation, in the configuration in which the vertex portion 8a is irradiated with the spot center of the excitation light 8, a design degree of freedom for the length L of the ridge can be increased in that the length L of the ridge 4 can correspond to a range of $\lambda/2$ or more and $5\lambda$ or less.

On the other hand, the result of the second simulation is a result for a configuration in which the upper corner portion 8a of the probe portion 40a is irradiated with the spot center of the excitation light 8. For example, as can be seen from a comparison between FIG. 19B and FIG. 21, in the configuration corresponding to the second simulation, the spot center of the excitation light 8 is emitted not on the vertex portion 8a close to the gold substrate 10A but on the upper corner portion 5 far from the gold substrate 10A. This means that, in the configuration in which the upper corner portion 5 is irradiated with the spot center of the excitation light 8, the irradiation of the excitation light 8 on a region other than the measurement target region of the sample can be reduced as compared with the configuration in which the vertex portion 8a is irradiated with the spot center of the excitation light 8. That is, in the configuration in which the upper corner portion 5 is irradiated with the spot center of the excitation light 8, it is possible to obtain an advantage that background noise caused by the irradiation of the excitation light 8 on a region other than the measurement target region of the sample can be reduced as compared with the configuration in which the vertex portion 8a is irradiated with the spot center of the excitation light 8. Further, in the configuration in which the upper corner portion 5 is irradiated with the spot center of the excitation light 8, a degree of freedom for the incident angle θ can be made larger than in the configuration in which the vertex portion 8a is irradiated with the spot center of the excitation light 8 in that the incident angle θ may be 90° or more.

The electric field intensity of the near-field light depends on the length L of the ridge 4 of the probe portion 40a and the incident angle θ. Therefore, in order to increase the electric field intensity of the near-field light, two methods are considered as a method of determining the length L of the ridge 4 and the incident angle θ, which are parameters. That is, there is a first method of determining the length L of the ridge 4 at which the electric field intensity of the near-field light is maximized after determining the incident angle θ and a second method of determining the incident angle θ at which the electric field intensity of the near-field light is maximized after determining the length L of the ridge 4.

<First Method>

Figure 23:
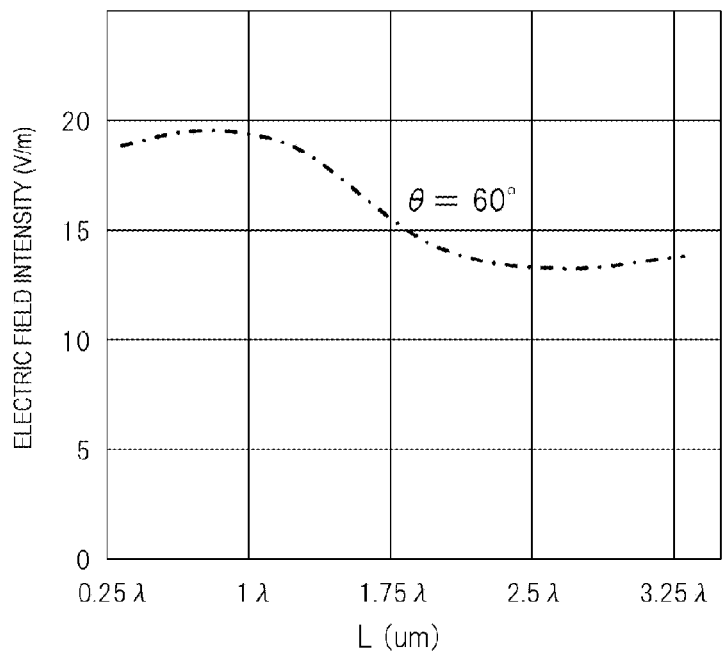
FIG. 23 is a graph showing a relationship between the electric field intensity and the length of the ridge when an incident angle is fixed at 60° in the first simulation.

The first method is an effective method in, for example, a case where the incident angle θ is fixed in a scanning probe microscope. For example, FIG. 23 is a graph showing a relationship between the length L of the ridge 4 and the electric field intensity of the near-field light in a case where the incident angle θ is fixed to θ=60° on the premise that the vertex portion is irradiated with the spot center of the excitation light. FIG. 23 can be calculated based on, for example, the graph shown in FIG. 20. In FIG. 23, when the incident angle θ is fixed to θ=60°, the length of the ridge 4 at which the electric field intensity is maximized is L=1λ. Therefore, in the scanning probe microscope in which the incident angle θ is fixed to θ=60°, a cantilever in which the length L of the ridge 4 of the probe portion 40a is L=λ may be adopted.

Figure 24:
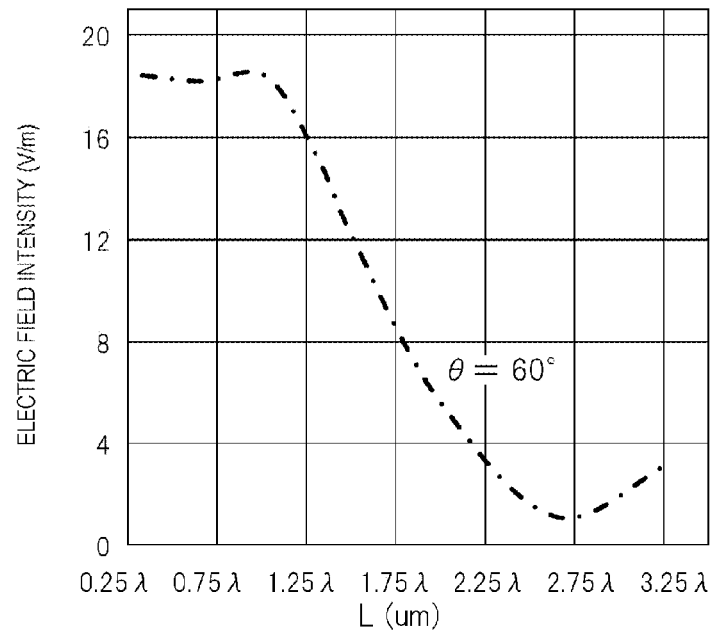
FIG. 24 is a graph showing a relationship between the electric field intensity and the length of the ridge when an incident angle is fixed at 60° in the second simulation.

Similarly, for example, FIG. 24 is a graph showing a relationship between the length L of the ridge 4 and the electric field intensity of the near-field light in a case where the incident angle θ is fixed to θ=60° on the premise that the upper corner portion is irradiated with the spot center of the excitation light. FIG. 24 can be calculated based on, for example, the graph shown in FIG. 22. In FIG. 24, when the incident angle θ is fixed to θ=60°, the length of the ridge 4 at which the electric field intensity is maximized is L=1λ. Therefore, in the scanning probe microscope in which the incident angle θ is fixed to θ=60°, a cantilever in which the length L of the ridge 4 of the probe portion 40a is L=λ may be adopted.

<Second Method>

The second method is an effective method in, for example, a case where a cantilever in which the length L of the ridge 4 is determined in advance is manufactured. In order to implement the second method, the scanning probe microscope needs to be configured to be capable of changing the incident angle θ.

Hereinafter, a configuration example of the scanning probe microscope in which the incident angle θ can be changed will be described.

Figure 25:
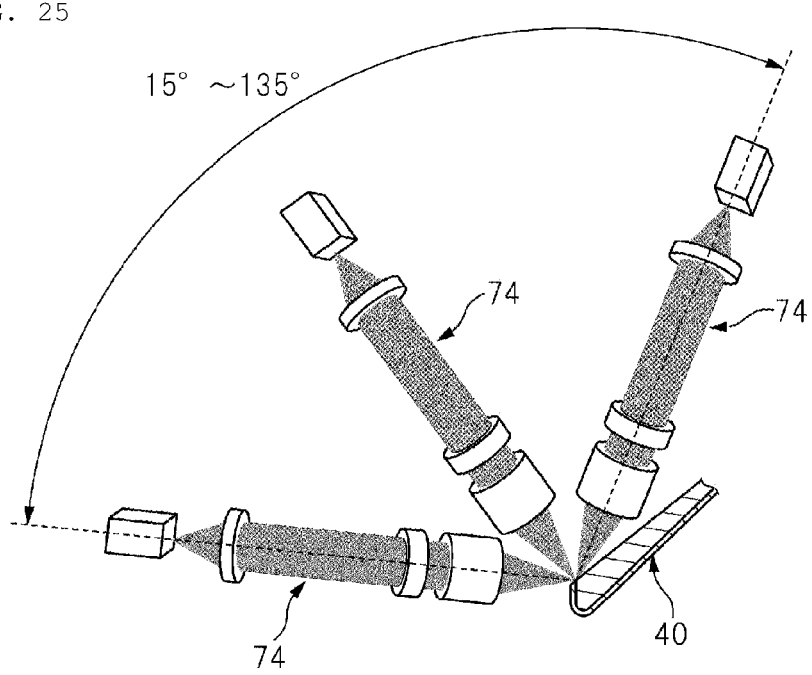
FIG. 25 is a diagram schematically showing an incident optical system included in a scanning probe microscope in which an incident angle can be changed.

FIG. 25 is a diagram schematically showing an incident optical system included in the scanning probe microscope in which the incident angle can be changed. In FIG. 25, the incident optical system 74 is an optical system that condenses the excitation light in a spot shape and irradiates the cantilever 40 with the excitation light, and the incident optical system 74 is configured to be capable of changing the incident angle to the cantilever 40 in a range of, for example, 15 degrees or more and 135 degrees or less. Specifically, for example, the incident optical system 74 includes an angle adjusting mechanism capable of setting an incident angle formed by a horizontal line passing through the vertex portion and a center line of the incident optical system 74 to 15° or more and 90° or less when the vertex portion is irradiated with the center of the spot shape. Further, the incident optical system 74 includes an angle adjusting mechanism capable of setting an incident angle formed by a horizontal line passing through the upper corner portion and the center line of the incident optical system 74 to 15 degrees or more and 135 degrees or less when the upper corner portion is irradiated with the center of the spot shape. Accordingly, it is possible to implement a scanning probe microscope in which an incident angle can be changed.

Figure 26A:
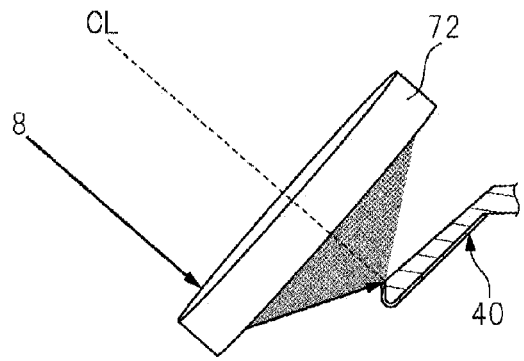
FIGS. 26A to 26C are diagrams illustrating that an incident angle of excitation light on the cantilever can be changed by changing an optical path configuration.
Figure 26B:
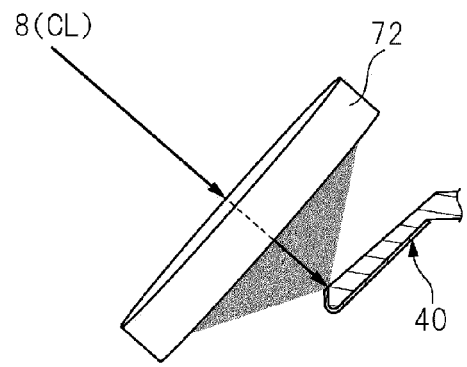
Figure 26C:
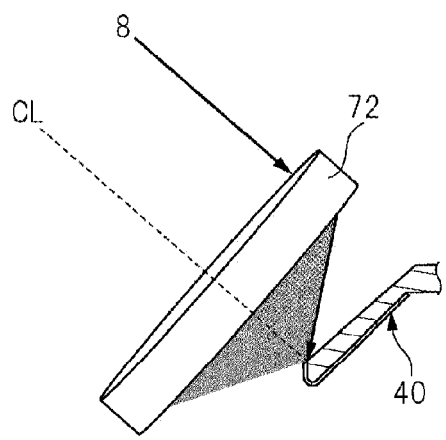

FIGS. 26A-26C is a diagram showing the lens 72 which is a condensing lens included in the scanning probe microscope in which the incident angle can be changed. In FIGS. 26A to 26C, by increasing an aperture (NA) of the lens 72, for example, as shown in FIG. 26A to FIG. 26C, the incident optical system is configured to include an optical path adjusting mechanism capable of changing an optical path configuration between an optical path configuration (see FIG. 26A and FIG. 26C) in which a center of the excitation light 8 passes through a position deviated from a center line CL of the lens 72 and an optical path configuration (see FIG. 26B) in which the center of the excitation light 8 coincides with the center line CL of the lens 72. Accordingly, as shown in FIG. 26A to FIG. 26C, the incident angle of the excitation light 8 to the cantilever 40 can be changed.

Figure 27:
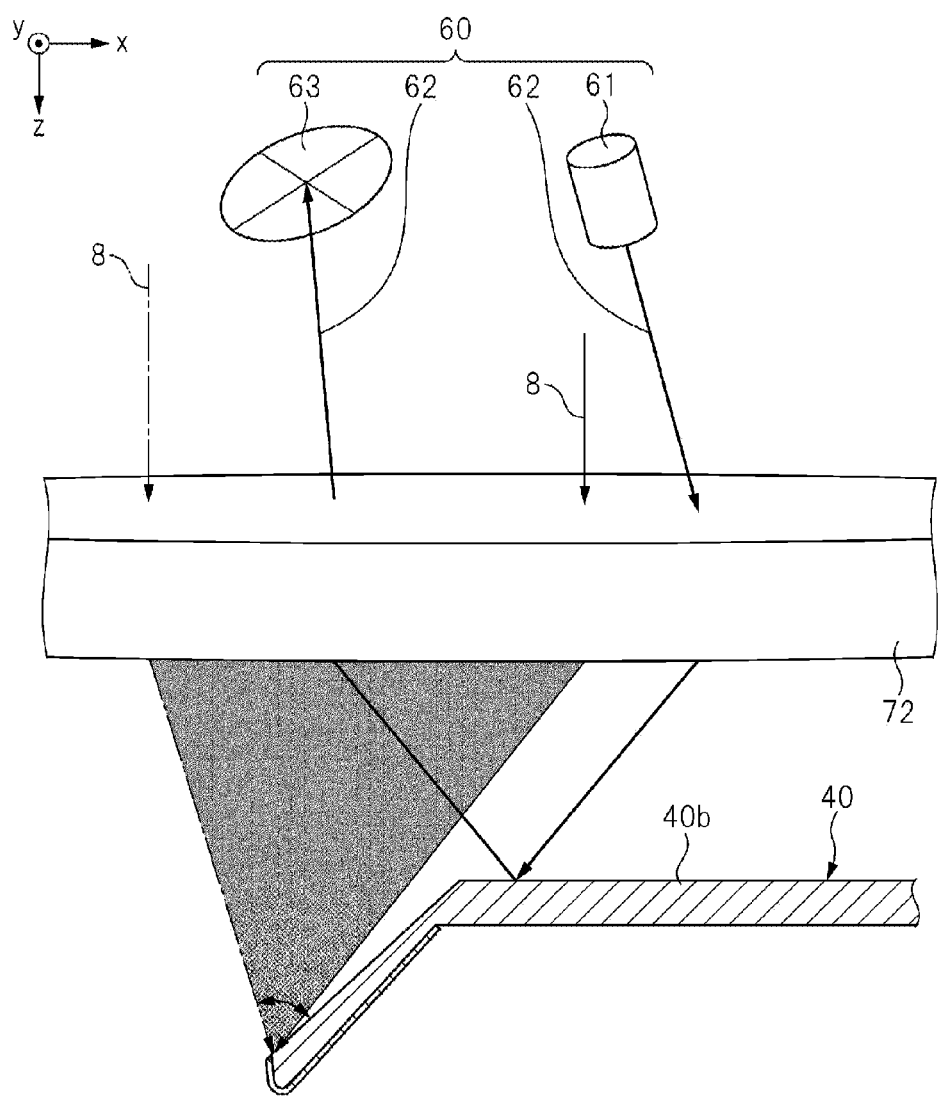
FIG. 27 is a diagram showing an example in which an optical path of an optical lever detection unit is also configured by using a lens.

As shown in FIG. 27, the lens 72 may be disposed above the cantilever 40. In this case, the incident angle of the excitation light 8 to the cantilever 40 can be changed by using the lens 72, and an optical path of the optical lever detection unit 60 can also be configured by using the lens 72. Specifically, after the beam portion 40b of the cantilever 40 is irradiated with the light 62 emitted from the light source 61 via the lens 72, the light 62 (reflected light) reflected by the beam portion 40b of the cantilever 40 is received by the photodetector 63 via the lens 72. Accordingly, the optical path of the optical lever detection unit 60 can also be configured by using the lens 72 disposed above the cantilever 40. As a result, according to the configuration shown in FIG. 27, it is possible to solve the difficulty of spatial arrangement in the optical lever detection unit 60.

Figure 28:
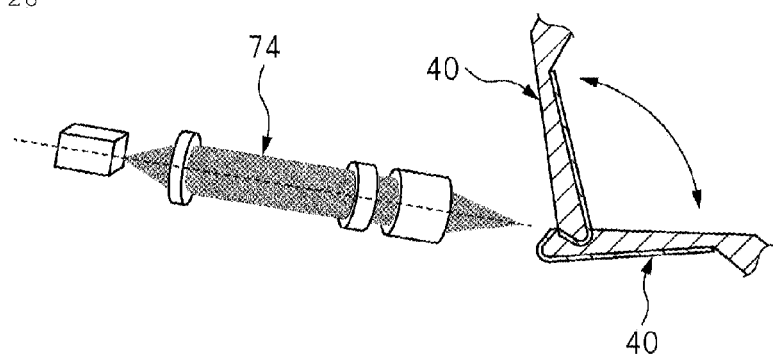
FIG. 28 is a diagram showing a cantilever included in the scanning probe microscope in which the incident angle can be changed.

FIG. 28 is a diagram showing a cantilever included in the scanning probe microscope in which the incident angle can be changed. In FIG. 28, the scanning probe microscope includes an adjusting unit that adjusts a position of the cantilever 40 so as to change the incident angle of the excitation light 8 emitted to the cantilever 40. Accordingly, for example, as shown in FIG. 28, as a result of adjusting the position of the cantilever 40, it is possible to change the incident angle of the excitation light 8 to the cantilever 40. Therefore, also with the configuration shown in FIG. 28, it is possible to implement a scanning probe microscope in which an incident angle can be changed.

<Modification>

Figure 29A:
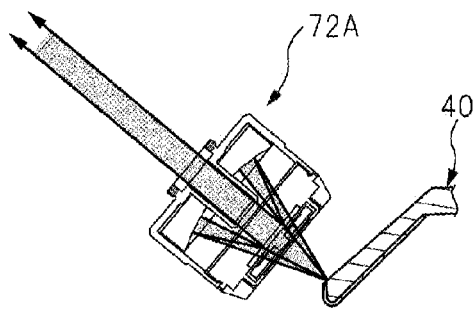
FIG. 29A is a diagram showing a reflective objective lens.
Figure 29B:
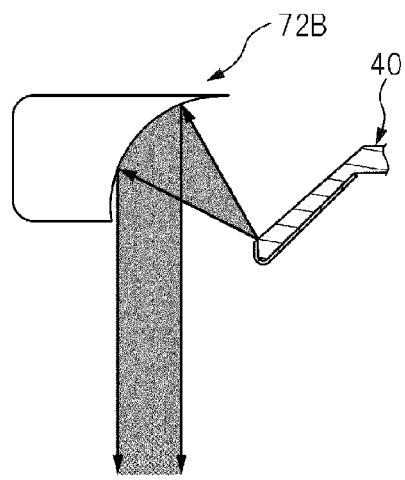
FIG. 29B is a diagram showing a parabolic mirror.
Figure 29C:
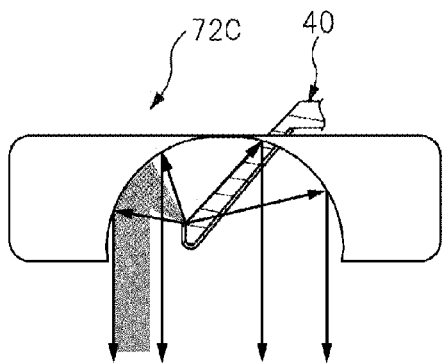
FIG. 29C is a diagram showing an integral mirror.

In the scanning probe microscope according to the present embodiment, for example, as shown in FIG. 1, the lens 72 which is a transmissive objective lens is used as a condensing optical component which condenses the excitation light 8 in a spot shape and irradiates the cantilever 40 with the excitation light 8. However, the condensing optical component is not limited to the lens 72, and for example, any optical component of a reflective objective lens 72A shown in FIG. 29A, a parabolic mirror 72B shown in FIG. 29B, and an integral mirror 72C shown in FIG. 29C may be used.

Figure 30:
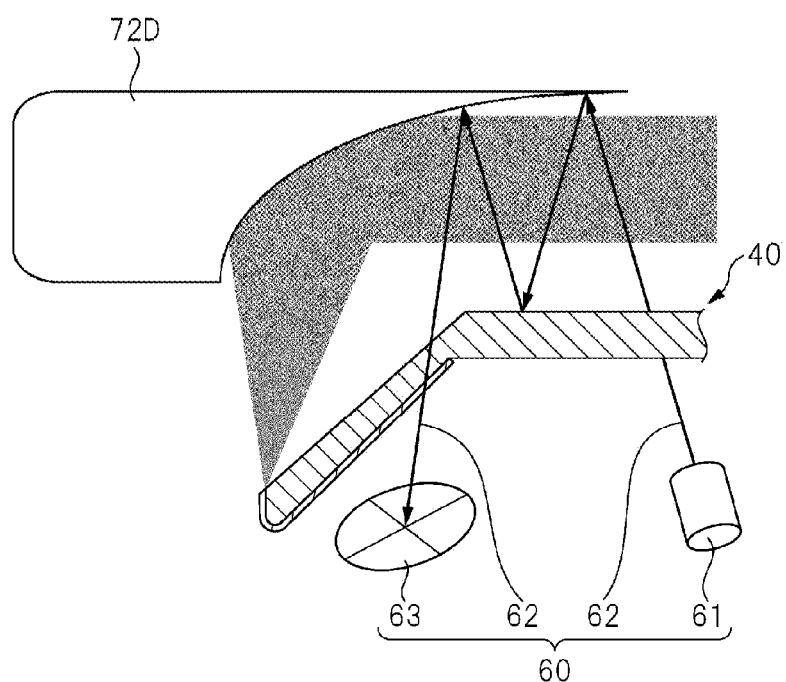
FIG. 30 is a diagram showing an example in which an optical path of an optical lever detection unit is also configured by using a condensing optical component.

As shown in FIG. 30, when a parabolic mirror 72D is used as a condensing optical component that condenses the excitation light in a spot shape and irradiates the cantilever 40 with the condensed excitation light, the optical path of the optical lever detection unit 60 may be configured by using the parabolic mirror 72D. For example, as shown in FIG. 30, the light 62 emitted from the light source 61 is reflected by the parabolic mirror 72D, and then the cantilever 40 is irradiated with the reflected light 62. Thereafter, the light 62 emitted to the cantilever 40 is reflected by the cantilever 40, is further reflected by the parabolic mirror 72D, and is received by the photodetector 63. Accordingly, the optical path of the optical lever detection unit 60 can also be configured by using the parabolic mirror 72D. As a result, according to the configuration shown in FIG. 30, it is possible to solve the difficulty of spatial arrangement in the optical lever detection unit 60.

The invention made by the inventor has been specifically described above based on the embodiment, but the invention is not limited to the embodiment, and it goes without saying that various changes can be made without departing from the scope of the invention.

For example, the probe portion 40a and the beam portion 40b may not be separated by clear outer features. Therefore, the probe portion 40a, the beam portion 40b, and the held portion 40c may be referred to as a first portion (40a), a second portion (40b), and a third portion (40c) of the cantilever 40, respectively.

REFERENCE SIGN LIST

1: lower surface
2: vertex portion
3: first line
4: ridge
5: upper corner portion
6: second line
6a: inclined portion
6b: straight portion
6c: horizontal straight portion
6d: inclined straight portion
6e: first recessed portion
6f: second recessed portion
7: metallic film
8: excitation light
8a: near-field light
8b: surface plasmon
10: sample
10A: gold substrate
20: sample holder
30: piezoelectric element stage
40: cantilever
40-1: cantilever
40-2: cantilever
40-3: cantilever
40-4: cantilever
40a: probe portion
40b: beam portion
40c: held portion
50: piezoelectric element stage
51: piezoelectric element actuator
52: head
60: optical lever detection unit
61: light source
62: light
63: photodetector
70: incident and detection optical system
71: light source
72: lens
72A: reflective objective lens
72B: parabolic mirror
72C: integral mirror
72D: parabolic mirror
73: light receiving optical system
74: incident optical system
80: spectroscope
90: control unit
100: scanning probe microscope
200: scanning probe microscope
300: scanning probe microscope
1000: probe portion
1001: vertex portion
1002: ridge
1003: upper corner portion
1004: first line
1005: metallic film
CL: center line
HL1: horizontal line
HL2: horizontal line

The invention claimed is:

1. A cantilever used in a scanning probe microscope, in a cross sectional view, the cantilever comprising:
a vertex portion that is portion close to a sample and is covered by a metallic film;
a ridge that is connected to the vertex portion and is covered by the metallic film;
an upper corner portion that is connected to the ridge;
a probe portion; and
a beam portion that is connected to the probe portion from a lower surface and configured to hold the probe portion, wherein
in the cross sectional view, the probe portion includes the vertex portion,
a first line that connects the vertex portion and the beam portion,
the ridge,
the upper corner portion, and
a second line that connects the upper corner portion and the beam portion, wherein the second line includes
an extension line portion that is located on extension of the ridge, and
a recessed portion that connects the upper corner portion and the extension line portion and is recessed toward the first line side, and
wherein
the upper corner portion and a part of the ridge are portions to be irradiated with excitation light emitted from a light source of the scanning probe microscope.

2. The cantilever according to claim 1, further comprising:
a probe portion; and
a beam portion that is connected to the probe portion from a lower surface and configured to hold the probe portion, wherein
in the cross sectional view, the probe portion includes the vertex portion, a first line that connects the vertex portion and the beam portion, the ridge, the upper corner portion, and a second line that connects the upper corner portion and the beam portion, each of the first line and the second line includes a straight portion directly connected to the beam portion, and an interval between the straight portion of the first line and the straight portion of the second line is the same or narrower as the straight portions approach the vertex portion.

3. The cantilever according to claim 1, wherein the metallic film is a metallic film of any of a gold film, a silver film, a platinum film and an aluminum film, an alloy film, or a multilayer film of a plurality of metals, and a material of the cantilever is any of silicon, silicon oxide, and silicon nitride.

4. A scanning probe microscope, comprising:

a sample holder that holds a sample;

a light source that emits excitation light; and a cantilever that is to be irradiated with the excitation light, wherein in a cross sectional view, the cantilever includes a vertex portion that is a portion close to the sample and is covered by a metallic film, a ridge that is connected to the vertex portion and is covered by the metallic film, and an upper corner portion that is connected to the ridge, and the upper corner portion and a part of the ridge are portions to be irradiated with excitation light emitted from a light source of the scanning probe microscope.

5. The scanning probe microscope according to claim 4, wherein the excitation light is emitted from an oblique direction with respect to the ridge.

6. The scanning probe microscope according to claim 4, wherein a direction in which the excitation light is emitted to the cantilever is adjustable according to a length of the ridge of the cantilever to be used.

7. The scanning probe microscope according to claim 4, wherein when a wavelength of the excitation light is $\lambda$, a length of the ridge is $5\lambda$ or less, the scanning probe microscope includes an incident optical system that condenses the excitation light into a spot shape and that irradiates the cantilever with the excitation light, and the incident optical system includes an angle adjusting mechanism capable of setting an incident angle formed by a horizontal line passing through the vertex portion and a center line of the incident optical system to 15 degrees or more and 90 degrees or less when the vertex portion is irradiated with a center of the spot shape.

8. The scanning probe microscope according to claim 4, wherein when a wavelength of the excitation light is $\lambda$, a length of the ridge $3\lambda$ or less, the scanning probe microscope includes an incident optical system that condenses the excitation light into a spot shape and that irradiates the cantilever with the excitation light, and the incident optical system includes an angle adjusting mechanism capable of setting an incident angle formed by a horizontal line passing through the upper corner portion and a center line of the incident optical system to 15 degrees or more and 135 degrees or less when the upper corner portion is irradiated with a center of the spot shape.

9. The scanning probe microscope according to claim 4, wherein when a wavelength of the excitation light is $\lambda$, a length of the ridge $5\lambda$ or less, the scanning probe microscope includes an incident optical system including a condensing lens that condenses the excitation light into a spot shape and irradiating the cantilever with the excitation light, and the incident optical system includes an optical path adjusting mechanism capable of changing an optical path configuration between a first optical path configuration in which a center of the excitation light coincides with a center of the condensing lens and a second optical path configuration in which the center of the excitation light passes through a position deviated from the center of the condensing lens.

10. The scanning probe microscope according to claim 9, further comprising:

an optical lever detection unit configured to detect deformation of the cantilever by detecting, using a photodetector via the condensing lens, reflected light, of light emitted to a beam portion of the cantilever via the condensing lens, from the beam portion of the cantilever.

11. The scanning probe microscope according to claim 4, wherein when a wavelength of the excitation light is $\lambda$, a length of the ridge is $5\lambda$ or less, and the scanning probe microscope includes an adjusting unit configured to adjust a position of the cantilever so as to change an incident angle of the excitation light emitted to the cantilever.

12. The scanning probe microscope according to claim 4, further comprising:

a condensing optical component that condenses the excitation light into a spot shape and irradiates the cantilever, wherein the condensing optical component is formed of any component of a transmissive objective lens, a reflective objective lens, a parabolic mirror, and an integral mirror.

13. The scanning probe microscope according to claim 12, further comprising:

an optical lever detection unit configured to detect deformation of the cantilever by detecting, using a photodetector via the condensing optical component, reflected light, of light emitted to a beam portion of the cantilever via the condensing optical component, from the beam portion of the cantilever.

14. The scanning probe microscope according to claim 4, wherein the excitation light has a wavelength in an infrared region, and the scanning probe microscope is configured to measure at a nano-resolution level any one of expansion of a sample surface, a change in reflectance, and a light induced force due to irradiation of the excitation light or irradiation of near-field light generated by the irradiation of the excitation light.

15. A measurement method using a scanning probe microscope, the method comprising:
(a) a step of irradiating a cantilever with excitation light emitted from a light source; and
(b) a step of detecting scattered light from a sample disposed opposite to the cantilever, wherein
the cantilever includes
a vertex portion that is a portion close to the sample and is covered by a metallic film,
a ridge that is connected to the vertex portion and is covered by the metallic film, and
an upper corner portion that is connected to the ridge, and
the upper corner portion and a part of the ridge are portions to be irradiated with the excitation light emitted from the light source of the scanning probe microscope.

16. The measurement method using a scanning probe microscope according to claim 15, wherein
the excitation light is emitted from an oblique direction with respect to the ridge.

17. The measurement method using a scanning probe microscope according to claim 15 wherein the excitation light is limited to a range from a wavelength of a near-ultraviolet region to a wavelength of an infrared region.

18. The measurement method using a scanning probe microscope according to claim 15 further comprising limiting the excitation light to a wavelength of 0.2 times the length of the ridge.

19. A cantilever comprising:
a probe portion; and
a beam portion that is connected to the probe portion from a lower surface and configured to hold the probe portion, wherein
in the cross sectional view, the probe portion includes
a vertex portion that is covered by a metallic film,
a first line that connects the vertex portion and the beam portion,
a ridge that is connected to the vertex portion and is covered by the metallic film,
an upper corner portion that is connected to the ridge, and
a second line that connects the upper corner portion and the beam portion,
the second line includes
an extension line portion that is located on extension of the ridge, and
a recessed portion that connects the upper corner portion and the extension line portion and is recessed toward the first line side.

* * * * *